US008128731B2

(12) United States Patent
Mashimo et al.

(10) Patent No.: US 8,128,731 B2
(45) Date of Patent: Mar. 6, 2012

(54) METHOD FOR SEPARATING AND ENRICHING ISOTOPE MATERIAL, MULTISTAGE ROTOR, AND APPARATUS FOR SEPARATING AND ENRICHING ISOTOPE MATERIAL

(75) Inventors: Tsutomu Mashimo, Kumamoto (JP); Masao Ono, Ibaraki (JP); Xinsheng Huang, Nagoya (JP); Yusuke Iguchi, Kumamoto (JP); Satoru Okayasu, Ibaraki (JP); Hiroshi Yasuoka, Ibaraki (JP); Koji Shibasaki, Chiba (JP); Masanori Sueyoshi, Chiba (JP)

(73) Assignees: National University Corporation Kumamoto University, Kumamto (JP); Maruwa Electronic Inc., Chiba (JP)

( * ) Notice: Subject to any disclaimer, the term of this patent is extended or adjusted under 35 U.S.C. 154(b) by 608 days.

(21) Appl. No.: 12/225,720

(22) PCT Filed: Apr. 4, 2007

(86) PCT No.: PCT/JP2007/057572
§ 371 (c)(1),
(2), (4) Date: Feb. 6, 2009

(87) PCT Pub. No.: WO2007/116911
PCT Pub. Date: Oct. 18, 2007

(65) Prior Publication Data
US 2009/0272265 A1 Nov. 5, 2009

(30) Foreign Application Priority Data

Apr. 4, 2006 (JP) ................................. 2006-103434

(51) Int. Cl.
*B01D 45/12* (2006.01)

(52) U.S. Cl. .................. 95/35; 55/406; 55/407; 95/270; 494/900; 210/512.1; 210/512.3; 210/360.1; 210/781; 210/787

(58) Field of Classification Search .................... 95/1, 8, 95/19, 22, 23, 26, 35; 55/406, 403, 407, 55/409; 96/417, 424, 421, 397; 204/157.21; 494/900; 210/512.1, 512.3, 360.1, 781, 787
See application file for complete search history.

(56) References Cited

U.S. PATENT DOCUMENTS

| | | | | | |
|---|---|---|---|---|---|
| 4,193,775 | A | * | 3/1980 | Wang | 95/35 |
| 4,225,324 | A | * | 9/1980 | Gazda | 95/35 |
| 4,235,612 | A | | 11/1980 | Gazda | |

(Continued)

FOREIGN PATENT DOCUMENTS

DE 906 094 C 3/1954

(Continued)

OTHER PUBLICATIONS

Supplemental European Search Report issued in Application No. 07 74 1008; Dated Aug. 31, 2010.

*Primary Examiner* — Duane Smith
*Assistant Examiner* — Minh-Chau Pham
(74) *Attorney, Agent, or Firm* — Oliff & Berridge, PLC

(57) ABSTRACT

A method for separating and enriching isotopes in an efficient and low-cost manner from a condensation-system (liquid or/and solid) material including two or more different isotopes by taking advantage of the sedimentation of atoms through an acceleration field by ultra-high speed rotation. The condensation-system material is placed in a sedimentation tank which is then housed in a supercentrifuge. The supercentrifuge in its rotor is rotation driven by an ultra-high speed rotation power source, and an acceleration field of energy of 100000 G to 1500000 G, i.e., about 100 to 800 m/s in terms of peripheral velocity, is applied to the above condensed (liquid or/and solid) material under such a temperature that is specified by an isotope material to be enriched. In this case, a difference in centrifugal force applied is provided between the isotopes in the condensed (liquid or/and solid) material comprising the at least two isotopes. By virtue of sedimentation by taking advantage of this difference, isotope atoms within the condensed material interact, and, consequently, separation and enrichment of the isotopes can be realized in a higher efficiency than the case where gas is used, by conducting the separation and enrichment of the isotopes within the liquid material, using an effective material, and using a multistaged rotor system.

15 Claims, 25 Drawing Sheets

U.S. PATENT DOCUMENTS

| | | | |
|---|---|---|---|
| 4,290,781 A * | 9/1981 | Wang | 95/35 |
| 5,024,739 A * | 6/1991 | Maya | 204/157.2 |
| 7,967,893 B2 * | 6/2011 | Schroeder | 95/35 |
| 2010/0018392 A1 * | 1/2010 | Schroeder | 95/35 |

FOREIGN PATENT DOCUMENTS

| | | |
|---|---|---|
| FR | 1 421 429 A | 12/1965 |
| FR | 2 566 285 A1 | 12/1985 |
| JP | A-02-268827 | 11/1990 |
| JP | A-09-2990178 | 11/1997 |
| JP | A-2003-103199 | 4/2003 |
| JP | A-2004-130182 | 4/2004 |
| JP | A-2005-532155 | 10/2005 |
| WO | WO 2004/004871 A1 | 1/2004 |

* cited by examiner

MATERIAL AT NORMAL STAGE

UNDER HIGH PRESSURE

EXAMPLE:

CASE OF ENRICHMENT IN ROTOR

EXPERIMENT IN SOLID PHASE

SAMPLE: SIMPLE SE
EXPERIMENTAL CONDITIONS:
820000G, 190°C, 100h $^{74}Se$ (0.87%), $^{76}Se$(9.02%),
$^{77}Se$(7.58%), $^{78}Se$(23.52%),
$^{80}Se$(49.82%), $^{82}Se$(9.19%), etc.

EXPERIMENT IN LIQUID PHASE

SAMPLE: SIMPLE SE
EXPERIMENTAL CONDITIONS:
820000G, 300°C, 100h $^{74}$Se (0.87%), $^{76}$Se(9.02%),
$^{77}$Se(7.58%), $^{78}$Se(23.52%),
$^{80}$Se(49.82%), $^{82}$Se(9.19%), etc.

CRYSTAL DIRECTION: a AXIS//GRAVITY DIRECTION

MEASUREMENT OF TWO OR MORE KINDS OF ISOTOPE ABUDANCE RATIO

SAMPLE:SIMPLE SE(SIX KINDS OR MORE OF ISOTOPES)
EXPERIMENTAL CONDITIONS: 820000G, 300°C, 100h
MEASURED ISOTOPE:74Se, 76Se, 82Se

CHANGE IN ISOTOPE ABUNDANCE RATIO OF AgI(350°C100h)

CHANGE IN ISOTOPE ABUNDANCE RATIO OF AgI (350°C 24h)

CHANGE IN ISOTOPE ABUNDANCE RATIO OF Cu1(350°C100h)

CHANGE IN ISOTOPE ABUNDANCE RATIO OF INTERMETALLIC COMPOUND InBi
(SAMPLE COLLECTED AFTER COOLING FOR 18 HOURS FROM 350°C TO 90°C)

METHOD FOR SEPARATING AND ENRICHING ISOTOPE MATERIAL, MULTISTAGE ROTOR, AND APPARATUS FOR SEPARATING AND ENRICHING ISOTOPE MATERIAL

TECHNICAL FIELD

The present invention relates to a method of separating and enriching isotopes through diffusion process from condensed material containing two or more different isotopes by using sedimentation of atoms through an acceleration field (a gravity field and a centrifugal field) by ultra-high speed rotation and an apparatus for separating and enriching, and a multistage rotor applied to the method in operation.

BACKGROUND ART

Here, the acceleration field is physically the same as the gravity field, and because the acceleration field in the present invention is generated by a centrifugal force, it may be referred to as a centrifugal field or a centrifugal acceleration field. Also, a strong (high) acceleration field is referred to as a high acceleration field, a high-gravity field, a supergravity field, or a supercentrifugal field.

Due to the energy situation and the highly-developed communication industry in recent years, the importance of isotopes such as energetic isotopes typified by U and Pr for atomic fission, and tritium and $^6$Li for tritium for atomic fusion, high-performance semiconductors composed of Be, C, B, Na, K, Cs, Mg, B, Al, Si, Ge, Co, Fe, Ga, As, P, Sb, Zn, In, Bi, Sn, S, Se, F, CL, I, O, N, and the like, quantum semiconductors composed of Be, C, B, Na, K, Cs, Mg, B, Al, Si, Ge, Co, Fe, Ga, As, P, Sb, Zn, In, Bi Sn, S, Se, F, CL, I, O, N, and the like, and medical isotopes typified by C, N, O, F, Cr, Ga, Br, Tc, I, Au, Tl, Br, In, La, Eu, Gd, Dy, Ho, Yb, Lu, Re, and the like has increased. As methods of enriching isotopes, there are electromagnetic method, gas diffusion method, gas centrifugal method, nozzle separation method, thermal diffusion method, laser method, cryogenic method, plasma method, and chemical exchange method. For the purpose of industrial manufacturing, the gas diffusion method and the gas centrifugal method are mainly used.

In nuclear fuel business, the isotope enrichment is regarded as the most important part in a nuclear fuel cycle which includes mining, refining, and enriching nuclear fuel material. Therefore, nuclear energy development and utilization starts with uranium enrichment, and, in the uranium enrichment technique, low-cost and operational safety are important.

The gas diffusion method is employed in United States and France, and uranium hexafluoride ($UF_6$) of corrosive gas is the material. The separation coefficient at a single-stage is approximately 1.003, and a large-scale cascade is set up in order to obtain enriched uranium with a concentration of 3 to 4%. In this method, corrosive gas, low separation coefficient, and high-cost caused by the large-scale facilities are pointed out as issues.

The gas centrifugal separation method is employed in Japan, United Kingdom, and Holland, and $UF_6$ is the material. The separation coefficient is expected to be 1.4, and a cascade is set up in order to obtain enriched uranium. In this method, corrosive gas, and high-cost caused by the large-scale facilities are still pointed out as issues. The laser method is regarded as a future technique together with atom method and molecular method, and the development has been continued in various countries.

In Patent Document 1 as a related art literature, a high-speed rotation test apparatus is disclosed. However, the main point is on the temperature control of a rotor at a time of the high-speed rotation, and it has no relation to the present invention. Patent Document 2 is a related art literature related to the invention by one of the inventors of the present invention, and an apparatus and a method for diffusion process by using centrifugal field of condensed material are disclosed. However, the invention of separating and enriching the condensed material composed of a plurality of isotopes are neither disclosed nor suggested. In Patent Document 3, although a multistage apparatus by a centrifugal rotor is disclosed, the disclosure is about no more than a simple liquid distributor, and separation and enrichment of a plurality of isotopes as in the present invention are neither disclosed nor suggested.

Patent Document 1: Japanese Unexamined Patent Publication No. 2003-103199
Patent Document 2: Japanese Unexamined Patent Publication No. Hei-9-290178
Patent Document 3: Japanese Unexamined Patent Publication No. 2004-130182

DISCLOSURE OF THE INVENTION

In technique for uranium enrichment, low-cost and operational safety are important, and the gas diffusion method and the gas centrifugal separation method are mainly used. As other methods, there are the electromagnetic method, the laser method, the nozzle separation method, the thermal diffusion method, the cryogenic method, the plasma method, and the chemical exchange method, but these methods are inefficient, and are hardly used in the industrial manufacturing except the case of enrichment for small amounts of particular kinds of isotopes. The gas diffusion method is employed in United States and France, and uranium hexafluoride ($UF_6$) is the material. The separation coefficient is approximately 1.003, and a large-scale cascade is set up in order to obtain enriched uranium with a concentration of 3 to 4%. In this method, corrosive gas, low separation coefficient, and high-cost caused by the large-scale facilities are pointed out as issues.

The centrifugal separation method is employed in Japan, United Kingdom, and Holland, and $UF_6$ is the material. The separation coefficient is expected to be 1.4, and a cascade is set up in order to obtain enriched uranium. In this method, corrosive gas, and high-cost caused by the large-scale facilities are still pointed out as issues. In particular, the improvement of the gas centrifugal method has been attempted in our country in recent years. However, the project has been cancelled because a desired value has not been achieved. Although the laser method and the ion exchange method are regarded as future techniques and the development has been continued in various countries, methods replacing the gas diffusion method and the gas centrifugal separation method have not appeared.

Therefore, there are no methods capable of centrifugal separation of a condensed phase (solid phase and liquid phase) in the above-mentioned techniques of isotope separation by centrifugal separation. When a number of atoms per unit volume is approximately compared between the gas phase and the condensed phase, atoms more than $10^4$ times of the gas phase are present in the condensed phase. By a simple consideration, if isotope enrichment by centrifugal separation is achieved in the condensed phase, in principle, the enrichment may be possible in facilities with a scale of one ten-thousandth of those in the centrifugal separation which has been performed hitherto in the gas phase. Unlike the gas phase, an interaction between atoms is strong in the condensed phase, and it departs from ideal system and a change in the isotope abundance ratio achieved by sedimentation of atoms becomes large. Therefore, the efficiency of enrichment may be improved.

Various methods for isotope enrichment have been proposed and put into practical use in principle, and the enrichment efficiency has been improved. In uranium enrichment and the like, there are no issues since the cost reduction has been fully attempted in the existing enrichment techniques. However, in semiconductors, quantum semiconductors, medical isotopes, and the like, the cost is still expensive. It is considered that the cost reduction of enrichment may be expected by a drastic cut in capital investment. A high-temperature supercentrifuge which realizes these features has just been developed recently.

(Basic Principle of the Present Invention)

Under an acceleration field, because force is applied to each component atom of condensed material, driving force is generated on an atom itself (body force). When an atomic weight and an atomic volume are different between component atoms, it makes a difference in magnitude of the body force. Sedimentation of atoms occurs when a difference in potential energy caused by the difference in the body force overcomes the chemical potential. The above-mentioned principle is explained by the sedimentation theory of atoms in the condensed material (solid or/and liquid), proposed by one of the inventors of the present invention, Tsutomu Mashimo. This is an important factor in the present invention as a phenomenon applicable to the case of isotopes.

Because the density of condensed material (solid or/and liquid) is more than $10^4$ times of that of gas, a processable number of atoms per unit volume is large, and this realizes the improvement of the enrichment efficiency. This is also an important factor in the present invention.

Next, reasons why sedimentation of isotope atoms occurs under such a high-speed acceleration field (high gravity field and centrifugal field) as mentioned above will be explained. For example, as shown in FIG. 1C which illustrates a crystal state in enriched material under the acceleration field and a force applied to atoms, when centrifugal process in a direction G1 (acceleration direction) indicated by an arrow is applied to a material M composed of an atom X (isotope X) having a large atomic weight and an atom Y (isotope Y) having a small atomic weight, the different body force (volume force) is selectively and directly applied to elements according to the difference in the atomic weight under this acceleration field. This is different from the case where pressure is uniformly applied to elements under the pressure field, irrespective of types of elements.

Thus, the isotope X having the large atomic weight receives the force stronger than the isotope Y having the small atomic weight, and an element X is displaced in a uniaxial direction. When this process is performed for a long time, the isotope X having the large atomic weight travels in the acceleration direction by an energy E (by the difference in potential energy between the non-dimensionalized isotope X and the non-dimensionalized isotope Y) expressed in equation (5) by this gravity field (refer to FIG. 1C).

Sedimentation of atoms containing isotopes in the condensed materials follows a diffusion equation below. In the self-consistent diffusion theory, the diffusion equation of multicomponent (s) system with 2, 3, or more components corresponding to Fick's first law is expressed as below with a term of external force by the gravity added to the term of chemical potential, where flux of the atom along the lattice is J', and the atomic weight, concentration, acceleration, gas constant, and absolute temperature are M, C, g, R, and T.

[Equation 1]

$$J'_i = -\sum_l^s (D'_{ii1} \nabla C_l) + \sum_j^s \left(\frac{D'_{ii2}}{RT} g(M_j - M_j^*)\right) \quad (1)$$

Here, $M^*_j$ is an effective mass of solvent of an atom j per mol volume, and the diffusion coefficient by chemical potential and the diffusion coefficient of sedimentation $D'_{ii1}$ and $D'_{ii2}$ are expressed as equation (2) below.

[Equation 2]

$$D'_{ii1} = \sum_l^s \left(L'_{ij} \frac{\partial \mu_j}{\partial C_l}\right) \quad (2)$$

$$D'_{ij2} = L'_{ij} \frac{kT}{C_i}$$

Here, $L'_{ij}$, $m_i$ and k are phenomenological coefficients of diffusion along the lattice, chemical potential, and boltzmann's constant. Moreover, the diffusion equation corresponding to Fick's second law in the centrifugal field of cylindrical coordinates is expressed as a next equation (3).

[Equation 3]

$$\frac{\partial C_i}{\partial t} = \sum_l^s \left(D'_{ii1} \frac{\partial^2 C_l}{\partial r^2}\right) + \sum_l^s \left(D'_{ii1} \frac{1}{r} \frac{\partial C_l}{\partial r}\right) + $$

$$\sum_l^s \sum_n^s \left(\frac{\partial D'_{ii1}}{\partial C_n} \frac{\partial C_n}{\partial r} \frac{\partial C_l}{\partial r}\right) - \frac{r\omega}{RT^2}\left[\sum_j^s D'_{ij2}(M_j - M_j^*)\right]\frac{\partial C_i}{\partial r} - $$

$$\frac{r\omega^2}{RT}\left\{\sum_j^s \left[\sum_n^s \left(\frac{\partial D'_{ij2}}{\partial C_n}\frac{\partial C_n}{\partial r}(M_j - M_j^*)\right) - \right. \right. $$
$$\left. \left. D'_{ij2}\frac{\partial M_j^*}{\partial r} + \frac{2}{r}D'_{ij2}(M_j - M_j^*)\right]\right\}C_i$$

By solving equation (1), the concentration distribution of multicomponent systems at normal state may be calculated. By solving equation (3), the time change in the concentration may be calculated. The activity coefficient: γ is set as 1 in the ideal system with no interaction between atoms. In the case where there is a chemical bond and in the case of the separation systems, it is different from the ideal system. If the chemical potential is known as the concentration function (that is, diffusion coefficient matrix), the concentration distribution may be properly calculated in any systems. However, if the off-diagonal element of the diffusion coefficient is not well known, the effects of only the diagonal element ($D_{ii1}$) are considered, and calculation is performed by changing a value where the diagonal element is divided by the diffusion coefficient ($D_{ii2}$) of sedimentation, that is, $Q_{ii}$ ($D_{ii1}/D_{ii2}=1+\partial \ln \gamma/\partial \ln$). The change in the concentration and the density becomes remarkable with the decrease of the activity coefficient, and are achieved with lower energy. If the activity coefficient is large, the diffusion hardly occurs due to the attractive force acting between atoms.

In a two-element system, in the case where the atomic volumes are the same as (a=1), and $Q_{i1}=D'_{i11}/D'_{ii}=0$, a solution at a normal state (the concentration distribution when the sufficient time passes) is

[Equation 4]

$$C/C_0 = \frac{(1+\beta)\exp(E/Q_{ii})}{1+\beta\exp(E/Q_{ii})} \quad (4)$$

expressed as equation (4). Here, E is expressed as equation (5) indicated by the difference of the potential energy between an atom "a" and an atom "b" in a radius "r".

[Equation 5]

$$E=(M_a-M_b)r^2\omega^2/2RT \quad (5)$$

"b" is a concentration ratio of atoms, the atom "a" and the atom "b", at a rotation center, expressed as ($\beta=C_{a0}/C_{b0}$).

As the centrifugal force is large, the realized gradient in the isotope abundance ratio becomes large. Specifically, the centrifugal force is generated by rotating a rotor, and the intensity of the material used for the rotor becomes higher at a low temperature. Thereby, the high centrifugal force may be obtained by rotating the rotor at a high number of rotations. Thus, the melting point of the intended material is preferably low. In consideration of the above, the condensed material to be used preferably has the diffusion coefficient as large as possible under the conditions for the enrichment process in order that the enrichment actually occurs and the process time becomes as short as possible. So as to achieve these conditions, using not only simple substance but also alloy, intermetallic compound, halide, chalcogenide, super-ionic conductor, and nonstoichiometric compound is advantageous. These may be conditions of the present invention.

The gas is analyzed with the theory based on the state equation, and atom collision hardly occurs so that the interaction may be omitted. Thus, the ideal system may be obtained. On the other hand, in the condensed material (liquid and sold), because atoms are adjacent each other, it departs from the ideal system under the high acceleration field. The chemical activity ($\gamma$) departs from the ideal state ($\gamma=1$), and the generated gradient of the isotope abundance ratio becomes larger. The activity coefficient under the high acceleration field becomes 1 or less as in an example, and the concentration ratio becomes higher than the ideal system. Because the chemical bond is not generated between isotopes, the concentration ratio becomes higher also from this reason.

Specifically, from equation (4), as Q is small, that is, as the diffusion coefficient of sedimentation is larger than the diffusion coefficient (normal diffusion coefficient) of the chemical potential, or as the activity coefficient is small, the concentration ratio becomes higher. Therefore, the condensate is more advantageous for isotope enrichment in comparison with the gas. In the condensate, it is important for the advantage that the material with Q as small systems is used.

(Material)

The material with the activity coefficient being small under the high acceleration field is advantageous for isotope enrichment. Therefore, in the enrichment process in the present invention, it is an important factor that the material to be processed is a condensate under that condition, and the material which satisfies composition, structure, and thermal conditions for achieving the high concentration ratio with respect to the element to be enriched. These may be conditions of the present invention. In the present invention, materials (material containing elements of two or more different isotopes) are gas, liquid, solid, mixed state of liquid and solid, or mixed state of these, when no acceleration field is applied. In the present invention, these materials are the condensed state (liquid state, solid state, or mixed state of liquid and solid) when the acceleration field is applied. When the above materials are liquid, or gas when applying no acceleration field, since these materials have fluidity, the supply and take out of the materials are easy, and it is advantageous when connecting the rotor to the enrichment apparatus. Thus, there is an effect that a cascade is easily set up (at a time of supply, take out, and plumbing). In the case where the material is liquid when applying acceleration field, the diffusion coefficient is generally larger than that of solid. Thus, there is an effect that faster enrichment is possible. In the case where the material is the solid state when applying the acceleration field, because convection hardly occurs, it is unnecessary to prevent the convection. Also, because the activity coefficient in the solid state is smaller than that in liquid state, the concentration ratio becomes larger than the case of the liquid state. In the case where the material is the mixed state of liquid and solid when applying the acceleration field, there are the effects from both the liquid state and the solid state. In this way, in the state of the material, degree of importance differs according to the time of supplying, taking out, and plumbing, the conditions under the normal temperature and the normal pressure, when applying the acceleration field, and the like.

As will be described clearly in an example, the experimental result is found that, in Se, Se—Te alloy, AgI and the like, Q is 1 or less, and the concentration ratio increases at the normal state in comparison with the gas. It is clear that it becomes the non-ideal system diffusion between isotopes. This effect is an important factor supporting the invention of the method of enrichment by using the materials in the condensed state of solid and liquid in the present invention.

In the present specification, the material subjected to the centrifugal process is the condensed material (solid, or/and liquid), and the material is referred to a sample in some cases.

(Rotor)

In the case where the material is in the condensed state, it is unnecessary to seal a sedimentation tank for generating enrichment by sedimentation of atoms, and two or more sedimentation tanks may be provided in a rotor. The material may travel by the fluid, and this is an important factor in the present invention.

By flowing and traveling the material, it is possible that a plurality of rotors and supercentrifuges may be combined to be multistage, and cascaded in order to increase the concentration ratio. This is an important factor in the invention.

(Viewpoint and Features of the Present Invention)

In the present invention, a sedimentation phenomenon of isotope atoms in the condensed material (solid and liquid) is focused. The realized isotope enrichment is a first achievement in the world, and the isotope enrichment using this phenomenon is absolutely unexampled in the world. In the present study and development, a technique of isotope enrichment with a theory different from that of the related art is developed and offered. That is, a technique of isotope enrichment with high efficiency and economic efficiency is developed and offered by using the sedimentation theory of the condensed materials system under the high acceleration field at a high temperature. The material density of the liquid and solid is $10^4$ times of that of the gas, and a scale of facilities and systems may become small.

As described in the basic theory, the concentration ratio becomes high at a normal state in the solid and liquid by the interaction between atoms. In fact, according to the study hitherto, the larger concentration in comparison with the gas centrifugal separation is found, and the concentration approximately twice larger is found according to the material. The study regarding sedimentation of isotopes has been just started, and there is an expectation that a higher concentration ratio may be achieved by finding appropriate process conditions.

Thus, when the present invention is used, the concentration ratio increases in comparison with the gas centrifugal method in which the material in the gas state is processed. Large cost reduction is expected when theoretically considering that the system may be largely miniaturized. In the uranium enrichment technique using this effect, there are the features to be expected such as high concentration ratio, high-safety without using corrosive gas, economic efficiency with compact facilities, unique techniques and the like, and the above-mentioned technical issues may be solved.

As described above, unlike the case of the gas, because the interaction between atoms is strong in the condensed phase, it departs from the ideal system under the high acceleration field, and the change in the isotope abundance ratio achieved by sedimentation of atoms becomes large. Thus, the concentration efficiency may increase according to the state of the material. Therefore, in the method of enriching isotopes by using the condensed material, selection of the material state which has the activity coefficient being smaller, the bond state, the crystal state, and the like is important in the invention.

In the enrichment of isotopes, it is important to specify the material state to be used and the process temperature in order to achieve the large diffusion coefficient and the high concentration ratio. For this, the diffusion coefficient and the activity coefficient of the material to be processed are important. The diffusion coefficient of the liquid material is larger in comparison with that of the solid material. The activity coefficient differs according to the material. However, when the activity coefficient becomes small, the change in the isotope abundance ratio achieved by sedimentation atoms becomes larger so that the concentration efficiency increases. Here, the practically-sufficient diffusion coefficient may not be obtained unless the temperature is the recrystallizing temperature or more as described above, with a few exceptions. A high acceleration field of at least 100,000 G or more is necessary for sedimentation of atoms in the condensed material. However, as the temperature increases, the intensity of the rotor decreases. Thus, in order to obtain the high gravity field, the low-temperature process is desirable. As expressed in equation (5), as the temperature is low, the difference of potential energy between isotope atoms becomes large so that the concentration ratio at the normal state becomes high. Therefore, in the case that the melting point of simple isotope element to be enriched is high, when using the solid solution or compound which contains isotope elements in the starting state as the material, it is advantageous for enrichment.

In the case of the solid phase, the diffusion coefficient generally becomes smaller in comparison with the liquid state. Because enrichment is necessarily performed within an industrially profitable time, the diffusion coefficient is desirably $10^{-12}$ cm$^2$/s or more. This diffusion coefficient depends on the material, but, as a simple substance, the temperature when the diffusion coefficient becomes $10^{-12}$ cm$^2$/s or more is approximately 0.55 to 0.65 times the melting point or more in materials of BCC (body-centered cubic) structure system, approximately 0.65 to 0.75 times the melting point or more in materials of FCC (face-centered cubic) structure system and HCP (hexagonal closed packed) structure system, and approximately 0.75 to 0.9 times the melting point or more in materials of diamond structure system. The diffusion phenomenon generally becomes notable when it is at the recrystallizing temperature or more. Because sedimentation of atoms is one of the diffusion phenomena, it is desirable to process at the recrystallizing temperature or more. Therefore, in the case of the solid, it is necessary to process at a temperature above the recrystallizing temperature of the material containing the element to be enriched. In fact, in the case of Se, Se—Te, In—Pb, and In—Bi in an example, sedimentation of isotope atoms was notably observed at the recrystallizing temperature or more which is 0.75 times or more of the melting point. However, the diffusion coefficient of superionic conductor or nonstoichiometric compound depends on the structure rather than the temperature, and the notable diffusion occurs even at the recrystallizing temperature or less. Thus, there are some cases that the recrystallizing temperature or less is accepted. This is clear, because, in AgI, notable sedimentation of isotopes are observed at a temperature (0.65 times or less of the melting point) lower than the case of Se, Se—Te, In—Pb, and In—Bi. The temperature of the melting point or more is accepted as long as it is the recrystallizing temperature or more. The diffusion coefficient of the liquid state is larger than that of the solid state, with a few exceptions.

Here, the recrystallizing temperature will be explained. When material work-hardened by cool working is heated up to a certain temperature, it is suddenly softened. This is because the crystal deformed by the work is divided and crystallized into polygonal fine grains. Thus, the increasing dislocation is suppressed, and the inside of the crystal grain is stabilized without deformation. This is called recrystallization and the temperature when the recrystallization starts is called a [recrystallizing temperature]. There are many materials having the recrystallizing temperature as a temperature (absolute temperature) approximately ½ of the melting point or more, and, in alloy and compound, the recrystallizing temperature is higher in many cases. Because the recrystallization largely relates to the diffusion phenomenon, it is appropriate that the recrystallizing temperature is used as the minimum temperature in the present method of enrichment.

The recrystallizing temperature and the diffusion coefficient closely relate to the melting point. The recrystallizing temperature is almost proportional to the melting point, and the diffusion coefficient of the material increases logarithmically when it is close to the melting point. In the case of a simple substance, the diffusion coefficient is $10^{-12}$ cm$^2$/s or more as being practical. In the case of alloy and compound, it becomes larger.

In the solid solution, the melting point of a material is between the melting points of component elements or lower, according to the composition. In the system where a compound is made, the melting point of the compound is higher than that of a simple component element, or between the melting points of the component elements, according to the composition. However, in the mixed phase of the liquid phase and the solid phase, and the solid solution phase, the melting point is between the melting points of component elements or lower. Therefore, when the melting point of the element of the isotopes to be enriched is high, the melting point is lowered by using the solid solution or compound containing elements having a low melting point, or the diffusion coefficient is made larger. However, it is not limited to these, because there are some like a Si—Au based compound in which the melting points of both Si and Au are high but the melting point of the solid solution is remarkably low. It is desirable that the solid solution and compound have low melting points.

In alloy and compound, the diffusion coefficient of different types of elements becomes larger than that of the self-diffusion of a simple substance, since the atom radius differs in the different elements. The concentration distribution realized by sedimentation of atoms in an experimental time is defined by the magnitude of the diffusion coefficient and the shift from the ideal system (activity coefficient is 1). This is understandable, because the change in the isotope abundance ratio of Se in Se—Te alloy in an example is twice larger than that of simple Se. In the case of compound, the diffusion coefficient becomes large in many cases, because an interstitial distance is generally becomes large. In particular, the melting points of halide and chalcogenide are low, and the atomic volumes of halogen element and chalcogen element are large. Thus, the structure has a low density, and the diffusion coefficient is large in many cases. In particular, the diffusion coefficient of super-ionic conductor is extremely large. This is clear, because the time of approximately 100 hours is necessary for realizing the concentration distribution at normal state in many materials, but the concentration distribution as the same level as that with approximately 100 hours is obtained with the time of 24 hours in AgI in an example. Because ionic bond and covalent bond is low in intermetallic compound, the activity coefficient is also small and the diffusion coefficient is relatively large. In fact, sedimentation of isotopes is observed as in an example of InBi. In nonstoichiometric compound such as transition element and rare-earth element in which a valence number of component elements is varied, atoms easily moves, and defects such as holes are easily produced so that the diffusion coefficient becomes large.

Here, a super-ionic conductor will be explained. The super-ionic conductor is a general term for the material which is apparently a solid, contains ions traveling at high-speed therein, and indicates ionic conductivity as the same level as those of dissolved salt and electrolyte solution. For example, α-silver iodide (α-AgI) is a typical super-ionic conductor. At 146° C. or more, silver iodide is a crystal and indicates silver ionic conductivity of 1.3 S/cm. When silver iodide is melted at 555° C., the ionic conductivity is rather lowered. Silver ions are present at random at four points of $12d$ sights, and the rest are the holes. The silver ions continuously change the positions, and indicate ionic conductivity by traveling in a direction of an electric field, when the electric field is applied. This is referred to as sublattice melting, since iodine ions make crystal lattice, and silver ions act as liquid in gaps of the crystal lattice.

It may be said that a super-ionic conductor is mesophase between solid and liquid, as the same as liquid and plastic crystal. In addition to these, there are well-known super-ionic ions such as fluorite ($CaF_2$), yttria-stabilized zirconia (YSZ), Na-b alumina, hollandite, $BaCeO_2$, and the like. The materials indicating super-ionic conductivity are also found in glass and high molecule, and they are referred to as super-ionic conductive glass, high molecule solid electrolyte, and the like. As the reasons why super-ionic conductor indicates high ionic conductivity, it is understood that: (1) the super-ionic conductor has special configuration in which ions easily move, (2) ion does not move indivisually, but moves in a group, and (3) when ions move, realignment of electron path occurs correspondingly. Therefore, as described above, because the diffusion coefficient of super-ionic conductor largely depends on the structure rather than the temperature, the sufficient sedimentation is possible even at the recrystallizing temperature or less.

Here, nonstoichiometric compound will be described. It is a compound having nonstoichiometry. There are Dalton's law of multiple proportion, Proust's law of definite composition, and the like. C. L. Berthollet pointed out a possibility of sequential change of composition. However, after the argument in eight years, Proust was declared as a winner. The presence of nonstoichiometric compound became gradually obvious in around the 1950's. Nonstoichiometric compound is referred to as berthollide compound with the name of Berthollet. In the case where the component element may change the valence number, this nonstoichiometry is generated, since a ratio of a number of elements constructing the compound may not be an integral ratio. The crystal of nonstoichiometric compound is incomplete in many cases. In this case, there are 1) interstitial type, 2) lattice defect type, 3) solid solution type, and the like. Therefore, in the diffusion coefficient of nonstoichiometric compound, defects such as holes are easily inserted, the bond force is weak, and the diffusion coefficient of nonstoichiometric compound largely depends on the chemical features and the structures so that sedimentation is possible even at the recrystallizing temperature or less.

When enrichment is performed by the method of the present invention, in the case where the isotope element to be enriched at normal state is a solid having a melting point notably higher than the temperature when acceleration is applied to the isotope element, it is necessary that the acceleration field is applied after reacting with other gas or liquid materials so as to change it into a liquid or solid material having a low melting point, or compound and alloy with a low melting point which contains isotope elements to be enriched are used as materials. There is a high possibility that uranium, chrome, ytterbium, silicon and the like may be used in this case. For example, it is thought that uranium is reacted with fluorine so as to obtain fluoride, or fluoride is used as a material. It is also thought that silicon is reacted with hydrogen so as to obtain silane, or silane is used as a material.

When enrichment is performed by the method of the present invention, in the case where the isotope to be enriched is gas at the normal state, for example, it is necessary to make it into liquid or solid by cooling, reacting with other solids, or the like. Because the material system is a monoatom or a condensate by van der waals bond of molecules, the bond is weak, and a distance between atoms and elements is large so that the diffusion coefficient is basically high. However, as the temperature is low, the difference of the potential energy between isotope atoms becomes large by gravity so that the concentration ratio at the normal state becomes high.

For a supercentrifuge, used is a centrifuge capable of generating a centrifugal acceleration field of energy of 100,000 G to 1,500,000 G with a peripheral velocity of approximately 100 to 800 m/s over a long time at high temperature, and the centrifugal acceleration field is applied to material.

In the present invention, because the condensed material is used, it is unnecessary to seal each sedimentation tank. Thus, a multistage rotor where two or more sedimentation tanks are provided in one rotor is proposed.

In the present invention, a plurality of rotors and supercentrifuges may be combined to be multistage, and cascaded in order to increase the concentration ratio.

The rotor is a multistage enrichment rotor having a plurality of sedimentation tanks on an inner wall of the rotor. The condensed material to be enriched is supplied to a first sedimentation tank from outside of the rotor. A multistage process tank is provided in one rotor, and the portion containing many light isotopes of the material to be processed flows and continuously overflows from the process tank. It passes two or more process tanks, and the portion containing many heavy isotopes remain at a previous stage in the rotor so that the concentration ratio increases.

Because the atomic volumes are the same in isotopes, the gradient in the concentration distribution of each isotope becomes as a constant straight line at the normal state. Thus, the depth of the sedimentation tanks is made as large as possible so as to increase the concentration ratio.

In the case where the material to be enriched is liquid, when there is a temperature gradient so that the temperature in each sedimentation tank is high toward the rotational center direction, the enrichment by sedimentation may be efficiently performed since generation of macro-convection is prevented.

In particular, when the material is liquid, there is a possibility of reflux, if the height from the rotational center axis of the exit of each sedimentation tank is the same. Thus, the height is made to become lower in a step-like shape so as to prevent the reflux.

When the material is solid, the material travel to each sedimentation tank is realized by utilizing the plastic flow phenomenon induced by a strong centrifugal force.

Finally, the supplied amount of the sample is discharged outside the rotor. While the material travels to sedimentation tanks in the rotor in sequence by the liquid flow, there is a high tendency that the heavy isotopes are mostly sedimented in the sedimentation tanks, and the light isotopes are discharged outside the rotor. By repeating this process for a long time, enrichment is possible because the heavy isotopes are in the sedimentation tanks and the light isotopes are enriched outside the rotor.

The material discharged outside from the rotor is circulated again to the same rotor. Thus, the concentration efficiency may be improved.

The material taken out from the bottom of the sedimentation tank of the rotor is continuously supplied to a next rotor. Then, the material taken out from the bottom of the sedimentation tank of that rotor is supplied to a next rotor. In this way; the concentration ratio may be improved by combining supercentrifuges in sequence.

In accordance with the present invention, in the method of enriching and separating isotopes by the supercentrifugal process of the condensed material, the material in the liquid state, the solid state, or the mixed state of the liquid phase and the solid phase composed of two or more different isotopes is used. Thus, the efficient enrichment of isotopes is possible with the density 10,000 times higher than the case using the method of gas centrifugal diffusion process in which the gas phase is processed as it is.

For performing an efficient enrichment by sedimentation of atoms, the diffusion coefficient, the activity coefficient and the like of the material to be processed are important. Because the interaction between atoms is extremely weak in the gas state, the diffusion is performed in the ideal system. On the other hand, due to the interaction between atoms in the condensed material such as solid and liquid, the diffusion is in the non-ideal system, the activity coefficient becomes small, and the diffusion coefficient of the sedimentation becomes larger than that by the chemical potential. Thus, the concentration ratio increases in comparison with the ideal system.

A diffusion coefficient of a material is generally large in the liquid in a comparison with the solid. Thus, on this point, the liquid is more advantageous for enrichment. However, the chemical potential in the liquid is larger than that in the solid, and thus there are some cases where the concentration ratio to be achieved becomes small. On the other hand, even in the case of the solid, there are materials having a large diffusion coefficient, and a decreasing activity coefficient. Thus, there are some cases that the solid is more advantageous. Also, because convection is more prevented by using the solid, there are some cases that the solid is more advantageous, Atoms do not travel within an industrial time unless it is at the recrystallizing temperature or more, with a few exceptions. Moreover, because enrichment is necessarily performed within an industrially profitable time, the diffusion coefficient is desirably $10^{-12}$ cm$^2$/s or more. This diffusion coefficient depends on the material, but, as a simple substance, the temperature is approximately 0.55 to 0.65 times the melting point or more in materials of BCC (body-centered cubic) structure system, approximately 0.65 to 0.75 times the melting point or more in materials of FCC (face-centered cubic) structure system and HCP (hexagonal closed packed) structure system, and approximately 0.75 to 0.9 times the melting point or more in materials of diamond structure system. The diffusion phenomenon generally becomes notable when it is at the recrystallizing temperature or more. Because sedimentation of atoms is one of the diffusion phenomena, it is desirable that the process is performed at least at the recrystallizing temperature or more. Meanwhile, for example, the high acceleration field with 100,000 G or more is necessary for sedimentation of atoms.

However, as the temperature increases, the intensity of the rotor decreases. Thus, in order to obtain the high gravity field, the low-temperature process is desirable. Therefore, in the case where the melting point of the simple isotope element to be enriched is high, it is advantageous when solid solution or compound containing isotopes is used as material. In the solid solution, the melting point of the material is between the melting pints of the component elements or lower, according to the composition. In the case of Kunakov type alloy, the melting point becomes low.

In the system where a compound is made, there are many compounds which have the melting point higher than that of a simple component element according to the composition. However, in the mixed phase of the liquid phase and the solid phase, and the solid solution phase, the melting point is between the melting points of component elements or lower. Therefore, when the melting point of the isotope of the element to be enriched is high, a material composed of solid solution or compound containing elements with lower melting points is used and the enrichment is realized. However, it is not limited to these, because there are some like a Si—Au based compound in which the melting points of both Si and Au are high but the melting point of the solid solution is remarkably low. It is desirable that the solid solution and compound have low melting points.

In alloy and compound, the diffusion coefficient becomes larger than that of the self-diffusion of a simple substance, since the atom radius differs in the different elements. In the case of compound, the diffusion coefficient becomes large in many cases, because an interstitial distance is generally becomes large. In particular, the melting points of halide and chalcogenide are low, and the atomic volumes of halogen element and chalcogen element are large. Thus, the structure has a low density, and the diffusion coefficient is large in many cases. In particular, the diffusion coefficient of superionic conductor is extremely large such that even the diffusion coefficient in the solid is equal to or larger than that in the liquid.

In nonstoichiometric compound such as transition element and rare-earth element in which valence numbers of component elements are varied, atoms easily moves, and defects such as holes are easily produced so that the diffusion coefficient is large. Nonstoichiometric compounds are present in Berthollide type alloy, and oxides and nitrides with component elements such as transition element and rare-earth element in which a valence number easily changes, chalcogenides, and the like. In the latter, the diffusion coefficients of oxygen, nitrogen, and chalcogen elements are large. Thus, in the method of isotope enrichment by using the condensed material in the present invention, the material state, the bond state, the crystal state and the like are effectively selected.

As understood from the above, when alloy and compound are used for the isotope enrichment, the supercentrifuge process may be performed at a temperature lower than the case of using a simple substance, and a material having a large intensity may be used for a rotor. Thus, the generated gravity, the dimension of the rotor, and a quantity of the material to be processed may be large. As a result, the enrichment efficiency increases, and the cost is reduced.

In the case where the material containing isotope elements to be enriched is gas at normal state in the present invention, the gas is necessarily changed into the liquid or the solid by cooling. Because the material system is a monoatom or a condensate by van der waals bond of molecules, the bond is weak, and a distance between atoms and elements is large so that the diffusion coefficient is basically high. Here, because the diffusion coefficient hardly changes in the liquid state, when enrichment is performed at a temperature as low as possible, the difference of potential energy between isotope atoms becomes large by gravity so that the concentration ratio at the normal state becomes high. The intensity of the rotor may be maintained when the temperature is low, and thus it is possible to obtain the high acceleration field. From this viewpoint, it is advantageous when the process temperature is low in the liquid state.

In the present invention, because a rotor is multistage, the concentration ratio of the rotor may increase remarkably. Moreover, the rotors may be multistage and cascaded. The material to be processed is in the condensed state so that the isotope enrichment may be realized with extremely small facilities.

In the multistage enrichment rotor, multistage process tanks are provided in one rotor. When the condensed material to be enriched is supplied from outside of the rotor to the first sedimentation tank, the portion containing many light isotopes flows and continuously overflows from the process tank. It passes two or more process tanks, and the portion containing many heavy isotopes remain at a previous stage in a rotor so that the concentration ratio increases. Finally, the supplied amount of the material is discharged outside the rotor. While the material travels to sedimentation tanks in the rotor in sequence by the liquid flow, the heavy isotopes are sedimented in the sedimentation tanks, and the light isotopes are discharged outside the rotor.

Because the atomic volumes are the same in isotopes, the gradient in the concentration distribution of each isotope becomes as a constant straight line at the normal state. Thus, the depth of the sedimentation tanks is made as large as possible so as to increase the concentration ratio.

The material discharged outside the rotor is circulated again to the same rotor. Thus, the concentration efficiency is improved.

The material taken out from the bottom of the sedimentation tank at the first stage of the rotor is continuously supplied to a next rotor. Thus, the concentration ratio may be improved.

In each sedimentation tank, in the case where the material is the liquid, when the temperature is higher at the rotational center in comparison with the outer periphery side of the rotor, the enrichment by sedimentation may be efficiently performed since generation of macro-convection may be prevented.

There is a possibility of reflux, if the height from the rotational center axis of the exit of each sedimentation tank is the same. Thus, the height is made to become lower in a step-like shape so as to prevent the reflux.

When the sample is solid, for the material travel to each sedimentation tank in the rotor, the plastic flow phenomenon induced by a strong centrifugal force is utilized.

Because it is unnecessary to use corrosive gas, high-safety, economic efficiency with compact facilities, further development of unique techniques and the like are expected. Therefore, by using this method, cost reduction is expected when theoretically considering that the system may be largely miniaturized.

BEST MODE(S) FOR CARRYING OUT THE INVENTION

Method for Separating and Enriching

Figure 1A:
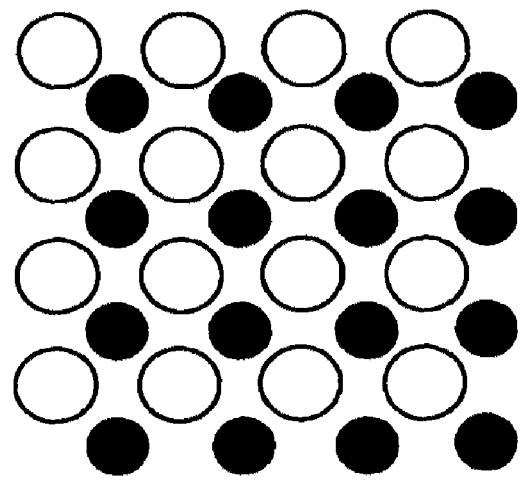
FIG. 1A is a view schematically illustrating a state of an atomic scale under a normal state of condensed material.
Figure 1B:
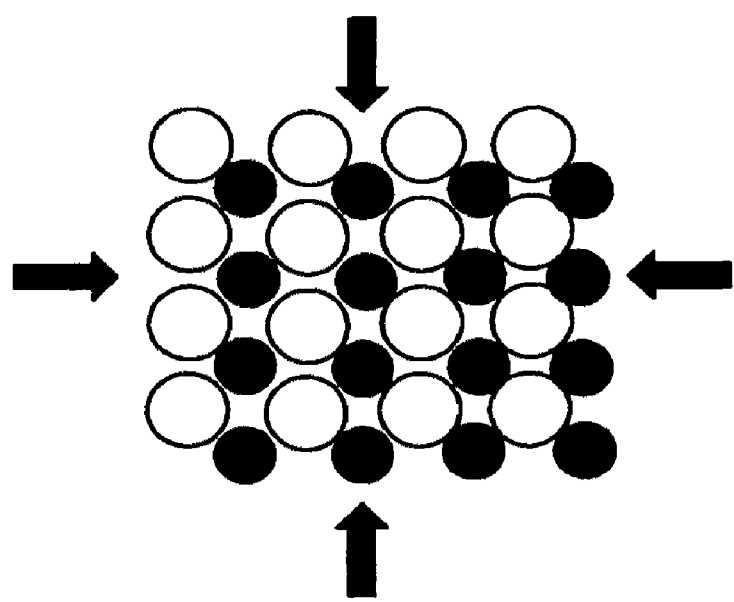
FIG. 1B is a view schematically illustrating the state of the atomic scale under high-pressure state of the condensed material.

For a supercentrifuge, it is necessary to use a centrifuge capable of generating a centrifugal acceleration field of energy of 100,000 to 1,500,000 G with a peripheral velocity of approximately 100 to 800 m/s over a long time at high temperature, and the centrifugal acceleration field is applied to material. For example, a centrifuge developed by Kumamoto University and Japan Atomic Energy Agency (former Japan Atomic Energy Research Institute) satisfies the above features. Moreover, a centrifuge having a large rotor with a long operation time is typically desired, and there is a high possibility that such a condition is realized by alloy or compound containing a plurality of elements rather than a simple substance.

The supercentrifuge is used so as to generate the acceleration field of, for example, approximately 100,000 G or more. The temperature of the sample is maintained from the melting point or more or the recrystallizing temperature or more to just below the melting point so that a diffusion phenomenon is facilitated. The centrifugal force is added so as to generate a body force on atoms, and thereby the diffusion phenomenon is directional. Thus, there is a high probability that an isotope element with a small atomic volume and a large atomic weight, that is, an isotope element in which a value corresponding to a density of atoms is large is diffused in a gravity direction, and an isotope element in which a value corresponding to a density of atoms is small is diffused in an opposite direction of the gravity direction. Because the diffusion is time-dependent, when the sample is placed under a centrifugal field for a long time, the change in the isotope abundance ratio occurs. In the case where the atomic volumes are the same, the concentration distribution at the normal state becomes a linear concentration distribution having a constant gradient as shown in an example. Thus, as the depth of the sedimentation tank is large, the concentration ratio increases.

As described above, unlike the gas phase, an interaction between atoms is strong in the condensed phase, and it departs from the ideal state under the supercentrifugal field. However, it is also important to select a material which notably departs from the ideal state, that is, a material having an activity coefficient less than 1 and as small as possible under a high acceleration field.

A diffusion coefficient of a material is generally large in liquid in a comparison with a solid. Thus, in the case where the activity coefficient is not large and there are no convection issues, the liquid state is more advantageous for enrichment (diffusion coefficient of liquid is approximately 10$^{-7}$ cm$^2$/s). In the solid state, an atom does not travel within an industrial time unless the temperature is the recrystallizing temperature or more, with a few exceptions. A high acceleration field of 100,000 G or more is necessary for sedimentation of atoms, and a higher acceleration field is more advantageous. Therefore, in consideration of intensity of the material for a rotor resisting in the high acceleration field, a lower temperature is advantageous since a gravity field may be large, except the case of extremely-low temperature.

In the case where the melting point of a simple isotope element to be enriched is high to the extent that diffusion is not realized industrially, it is good to use a solid solution or compound containing isotope elements as material. The melting point of solid solution is between the melting points of component elements or lower, according to the composition. In the system where a compound is made, there are many compounds which have the melting point higher than that of a simple component element according to the composition. However, in the mixed phase of the liquid phase and the solid phase, and the solid solution phase, the melting point is between the melting points of component elements or lower. Therefore, when the melting point of the isotope of the element to be enriched is high, a material composed of solid solution or compound containing elements with lower melting points is used.

In consideration of the melting point, alloy containing elements with low melting points such as Li, K, Ca, Ga, In, Sn, Pb, P, As, Sb, S, Se, Te, Zn, Cd, and Hg, and compound containing intermetallic compound are advantageous for enrichment. Halides and chalcogenide are also advantageous on this point. However, it is not limited to these, because there are some like a Si—Au based compound in which the melting points of both Si and Au are high but the melting point of the solid solution is remarkably low. It is desirable that the solid solution and compound have the low melting points.

The diffusion coefficients of alloy and compound are larger than that of self-diffusion of a simple substance. Actually, in the case of Se—Te based solid phase as shown in an example, observed is a concentration ratio approximately twice as high as that of the solid phase of simple Se. In the case of compound, the diffusion coefficient is large in many cases since a distance between lattice points becomes generally large. In particular, the melting points of halide and chalcogenide are low, and the atomic volumes of a halogen element and a chalcogen element are large. Thus, the structures have low densities, and the diffusion coefficients are large in many cases.

Because enrichment is necessarily performed within an industrially profitable time, the diffusion coefficient is desirably $10^{-12}$ cm$^2$/s or more. This diffusion coefficient depends on the material, but, as a simple substance, the temperature is approximately 0.55 to 0.65 times the melting point or more in materials of BCC (body-centered cubic) structure system, approximately 0.65 to 0.75 times the melting point or more in materials of FCC (face-centered cubic) structure system and HCP (hexagonal closed packed) structure system, and approximately 0.75 to 0.9 times the melting point or more in materials of diamond structure system. In alloy and compound, the temperature is higher in many cases. These temperatures are the recrystallizing temperatures or more which deeply relates to the diffusion phenomenon so that the process temperature is necessarily set at the recrystallizing temperature in the case of these materials.

In particular, the diffusion coefficient of a super-ionic conductor is remarkably large to the extent that even the diffusion coefficient in the solid state is equal to or larger than that in the liquid state. In nonstoichiometric compound such as transition element and rare-earth element in which valence numbers of component elements change, atoms easily moves, and defects such as holes are easily produced so that the diffusion coefficient is large. In oxide, nitride, and chalcogenide of component elements such as transition element and rare-earth element, the diffusion coefficients of an oxygen element, a nitrogen element, and a chalcogen element are large.

In super-ionic conductor and nonstoichiometric compound, the diffusion coefficient depends on a crystal structure and a defect structure rather than a temperature. Thus, a sufficient diffusion coefficient is obtained even if the temperature is lower than the process temperature described in 0038A. In such a case, the process time may be shortened.

Actually, as shown in an example, the sufficient sedimentation is observed in AgI at a temperature lower than that described above. Also, the state approaches the normal state with a time shorter than the case of other alloys, and it is understood that an extremely-speedy process is possible. Therefore, the above-mentioned materials are used according to purposes in the method of enriching isotopes by using the condensed materials in the present invention.

In the case where the isotope element to be enriched is gas at the normal state, it is necessary to change it into liquid or solid by cooling. Because the material system is a monoatom or a condensate by van der waals bond of molecules, the bond is weak, and a distance between atoms or elements is large so that the diffusion coefficient is basically high. However, from equation (4) and equation (5), a denominator becomes small in a low temperature, and the difference of potential energy between isotope atoms becomes large by gravity so that the concentration ratio at the normal state becomes high. Because the diffusion coefficient in the liquid state hardly changes, it is advantageous when the process temperature is low in the liquid state.

In the case where the material containing the isotope element to be enriched is gas at the normal state, it is necessary to consider the effects of pressure when setting the temperature. For example, in the case of carbon dioxide with a high subliming temperature in candidate materials, the subliming temperature is −78.9° C. However, a boiling point rises with an increase of the pressure. Thus, in carbon dioxide which is regarded as having the highest subliming temperature, for example, a supercritical point is 31° C. under a pressure of 72.9 atmospheres. Under a high gravity field, the pressure increases so that the process at approximately 100° C. or less is specifically desired.

For a supercentrifuge, used is a centrifuge capable of generating a centrifugal acceleration field of energy of 100,000 G to 1,500,000 G with a peripheral velocity of approximately 100 to 800 m/s over a long time at high temperature, and the centrifugal acceleration field is applied to material. The acceleration field and the energy are preferable if they are as large as possible, but they are limited by intensity of a rotor, an operation time, and the like. When the diffusion coefficient is small, the operation time is necessarily long.

Figure 3A:
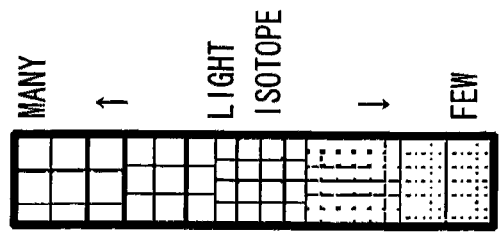
FIG. 3A is a view illustrating progression of enrichment only in the rotor.
Figure 3A:
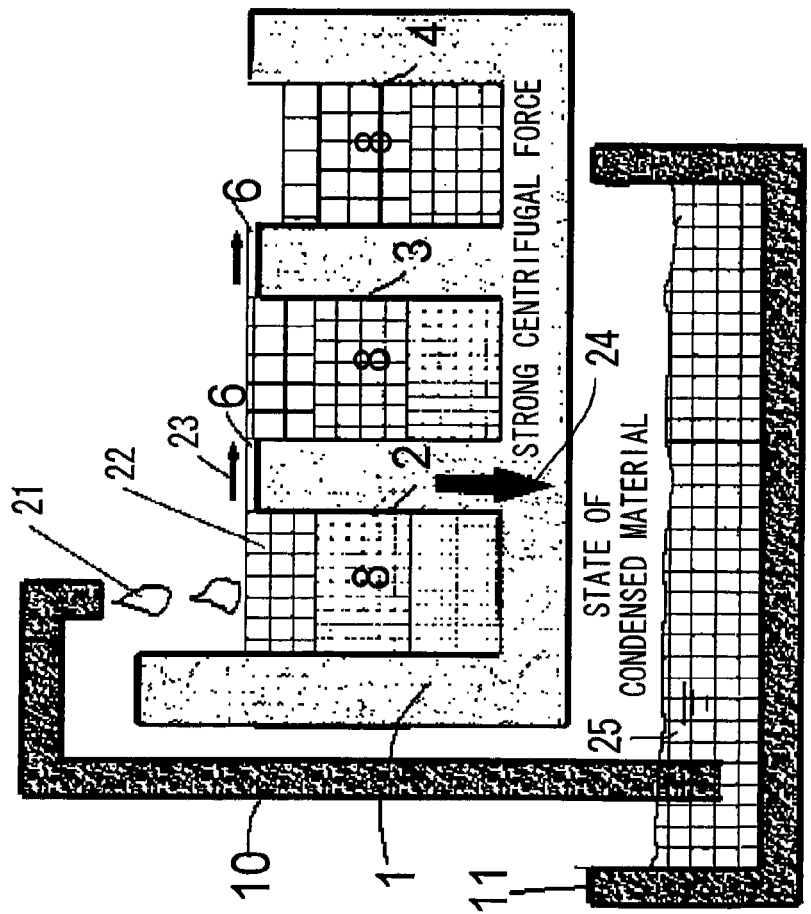
Figure 3B:
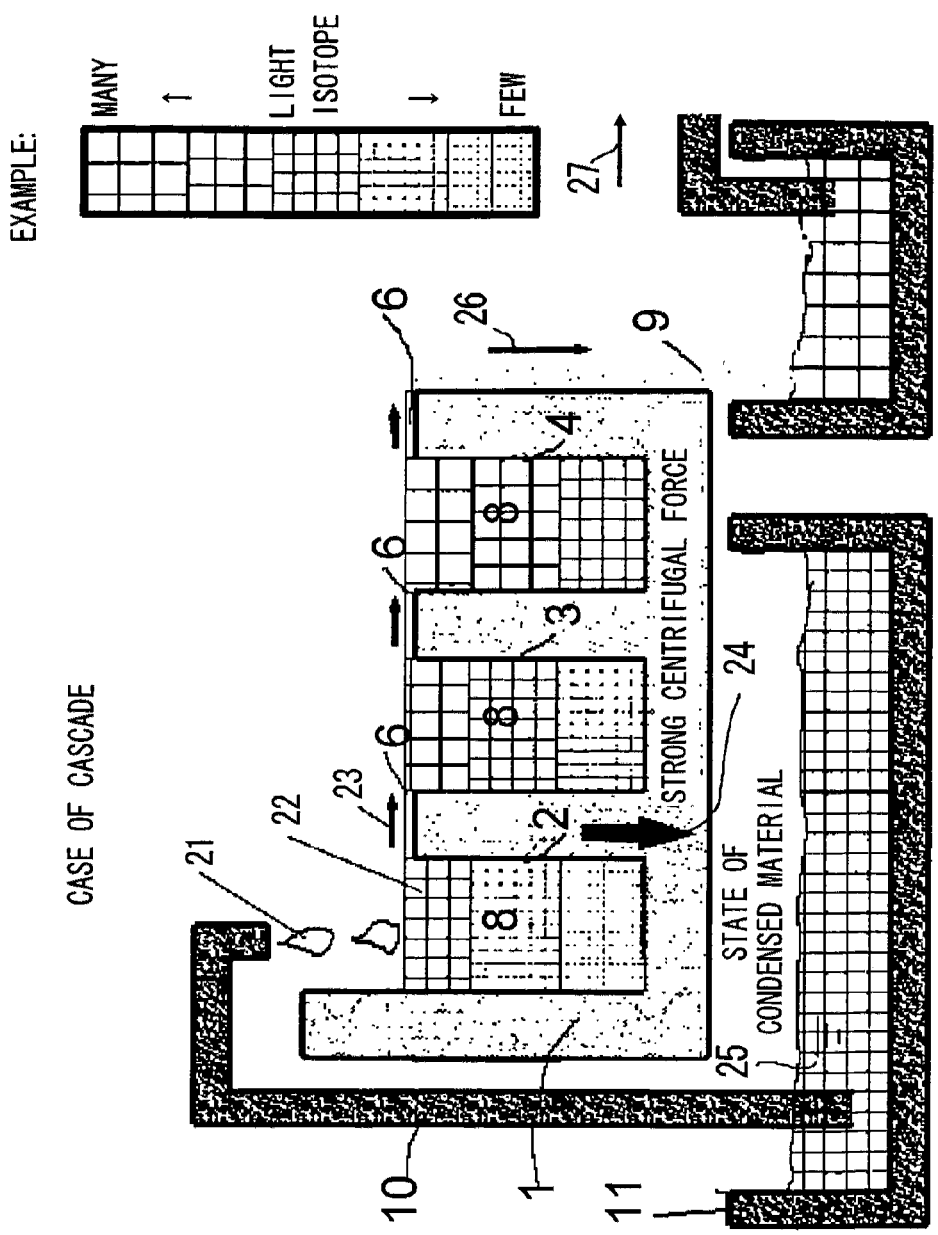
FIG. 3B is a view illustrating a travel of the condensed material in the case where a plurality of rotors are set in a cascade.
Figure 3C:
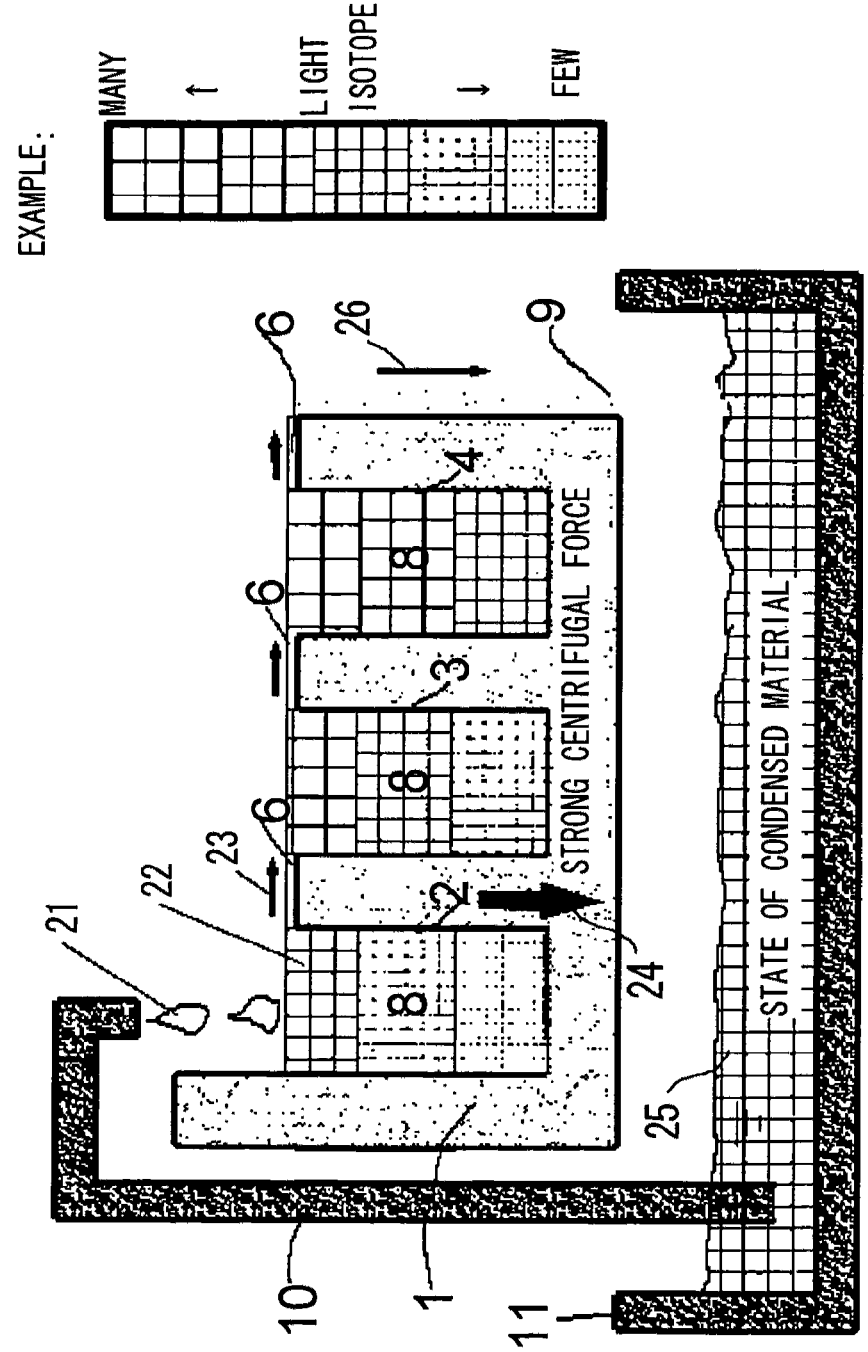
FIG. 3C is a view illustrating a travel of the condensed material in the case of recirculation.

In the present invention, the features of the condensed materials are used. Two or more sedimentation tanks are provided in a rotor, and multistage enrichment is performed with the rotor by using liquid flow or solid flow. By using the features of the condensed materials, two or more sedimentation tanks are provided in a rotor, and multistage enrichment is performed with the rotor by using liquid flow or solid flow. FIG. 3A is a view illustrating progress of enrichment in only the rotor. A reference numeral 21 in the figure indicates a state when supplying the condensed material (solid or liquid), a reference numeral 22 indicates the condensed material (solid or liquid), a reference numeral 23 indicates a travel (solid or plastic flow) by flow, a reference numeral 24 indicates a strong centrifugal force, and a reference numeral 25 indicates the material in the condensed state. FIG. 3B is a view illustrating a travel of the condensed material in the case where a plurality of rotors are set in a cascade. A reference numeral 26 in the figure indicates a discharge, and a reference numeral 27 indicates a transfer to a next centrifuge. FIG. 3C is a view illustrating a travel of the condensed material in the case of recirculation.

Moreover, for increasing the concentration ratio, these rotors may be multistage, or cascaded. As a result, the enrichment of isotopes is realized with extremely small facilities and a large concentration ratio in comparison with the gas diffusion method and the gas centrifugal method.

The sample containing heavy isotopes a lot is discharged from the rotor, and the material containing light isotopes a lot and discharged outside from the rotor is circulated to the same rotor again as shown in FIG. 3C, the rotor provided with one or more sedimentation tanks. Thus, the concentration efficiency increases.

The material taken out from the bottom of the sedimentation tank at a first stage of the rotor is continuously supplied to a next rotor. Then, the material taken out from the bottom of the sedimentation tank of that rotor is supplied to a next rotor. In this way, the concentration ratio may be improved by combining supercentrifuges in sequence. Cascading is possible by combining a plurality of these rotors or centrifuges.

When the material is solid, the plastic flow due to the plastic deformation notably occurs under a sufficiently-strong acceleration field where a stress exceeding the intensity of the material is generated. It is confirmed hitherto that the solid sample flows, by the plastic flow, through a pinhole of even approximately 0.5 mm. In this rotor for enrichment, the plastic flow phenomenon is actively utilized as a traveling means of a material between the sedimentation tanks and in the sample drop section. There is no other precedent where the plastic flow phenomenon generated under a strong centrifugal acceleration field is utilized for material travel. This is one of the important factors supporting the presenting invention.

Because the atomic volumes are the same in isotopes, the gradient in the isotope abundance ratio becomes as a constant straight line in the state (normal state) where the centrifugal process is sufficiently performed. Thus, the depth of the sedimentation tank is made as large as possible so as to increase the concentration ratio.

In the case where the material is liquid, when the temperature in each sedimentation tank is higher at the rotational center in comparison with outside thereof, enrichment by sedimentation may be efficiently performed since generation of macro-convection is prevented. In particular, when the material is liquid, there is a possibility of reflux, if the height from the rotational center axis of the exit of each sedimentation tank is the same. Thus, the height is made to become lower in a step-like shape so as to prevent the reflux.

When the material is solid, for the material travel to each sedimentation tank in the rotor, the plastic flow phenomenon induced by a strong centrifugal force is utilized.

(Rotor)

The strong acceleration field of 100,000 G or more is necessary for sedimentation of atoms. However, as the temperature increases, the intensity of the rotor decreases. Thus, in order to obtain the high gravity field, the process is desirably performed with a temperature as low as possible. Therefore, in the case where the melting point of the simple isotope element to be enriched is high, it is advantageous for enrichment to use solid solution or compound containing isotope elements as the material. The material for the rotor is currently resistant to rotation of peripheral velocity of approximately 500 m/s at the temperature up to 400° C. in the case of titanium alloy, resistant to rotation of peripheral velocity of approximately 400 m/s at the temperature up to 600° C. in the case of inconel alloy, and resistant to rotation of peripheral velocity of approximately 200 m/s at the temperature up to 1000° C. in the case of MA alloy.

Specifically, the process temperature of 800° C. or less is desired from the viewpoint of intensity of the material for a rotor. Preferably, it is 600° C. or less. Thus, as the temperature is low, the high acceleration field may be generated and the concentration ratio increases. In the future, it is possible that the rotor composed of material with a large intensity at a high temperature is developed, and the process temperature increases as development of a technique of manufacturing a rotor and a method of cooling expands. As the material for a rotor, for example, high-temperature and high-intensity materials such as ceramics, composite materials of metal and ceramics and the like are developed. As a method of applying such a temperature, there are a method of indirectly heating the material by heating a container, and a method of directly heating the material. As a heating apparatus for such heating, there are apparatuses using heating methods which will be described below. That is, for example, there are heating apparatuses using a method of heating by induction heating (specifically, high-frequency heating) (vacuum or gas atmosphere), a method of heating by joule heating (vacuum or gas atmosphere), a method of heating by reacted heating (including combustion heating) (vacuum or gas atmosphere), a method of heating by hot air (gas atmosphere), a method of heating by laser heating (vacuum or gas atmosphere), and a method of heating by radiation heating (heating of a radiation plate and radiating body is performed, for example, by induction heating, joule heating, combustion heating, laser heating, infrared ray heating, or the like) (vacuum or gas atmosphere). Adjustability of these heating methods are varied according to the temperature, material, shape, and the like.

As apparatus for generating the high acceleration field, for example, a supergravity generator capable of stably generating a high acceleration field of acceleration velocity of approximately 1,000,000 G or more as maximum (refer to Patent Document 1 and Patent Document 2) may be used. This supergravity generator includes, for example, a rotor capable of storing a capsule to be filled with material, and an air-turbine for driving the rotor.

Figure 4:
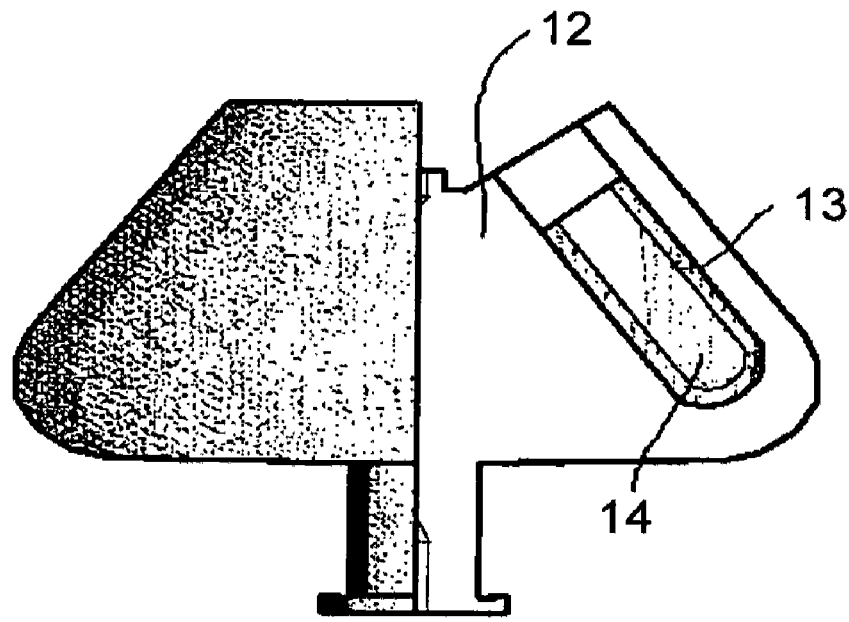
FIG. 4 is a view illustrating enrichment by an existing rotor.

The rotor may be composed of, for example, alloy of Ti (titanium)-6Al (aluminum)-4V (vanadium) with an outer diameter of 80 mm or 46 mm. The capsule may be composed of, for example, alloy of Ti-6Al-4V or SUS304 with an inner diameter of 5 mm or 3 mm (refer to FIG. 4). In the supergravity generator, the capsule heated by the air-turbine is rotated at high speed, for example, at approximately 100,000 rpm or more to 220,000 rpm or less so as to generate the high acceleration field.

Figure 2A:
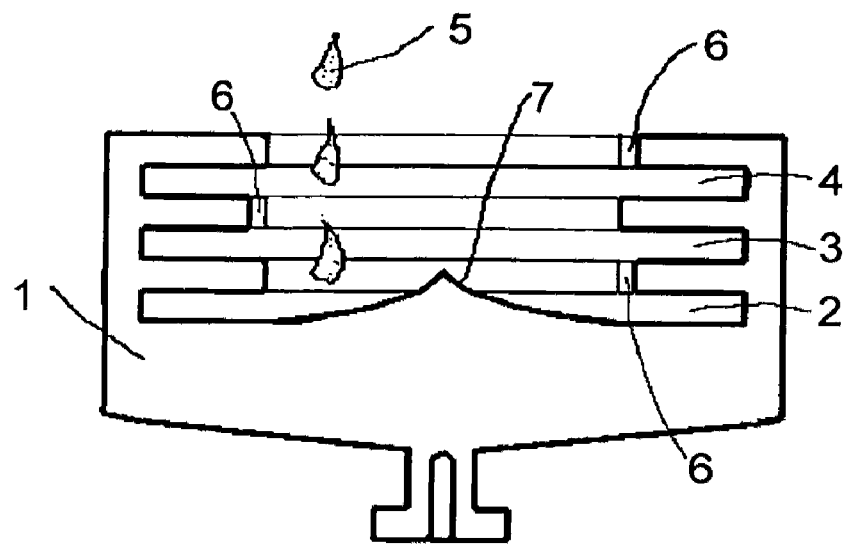
FIG. 2A is a vertical cross-sectional view illustrating the configuration of a rotor provided with a plurality of sedimentation tanks on inner walls.

A conceptual view of the multistage enrichment rotor of the present invention is shown in FIG. 2A. It is the multistage enrichment rotor having a plurality of sedimentation tanks on an inner wall of the rotor. The condensed material to be enriched is supplied to a first sedimentation tank from outside the rotor. When the sedimentation tank is saturated, the sample starts traveling to a next sedimentation tank. For the material travel to each sedimentation tank, the plastic flow induced by a liquid flow or a strong centrifugal force is utilized. Finally, the last sedimentation is filled. While the material travels to sedimentation tanks in the rotor in sequence by the liquid flow or the plastic flow in the previous process, there is a high tendency that the heavy isotopes are mostly sedimented in more-previous sedimentation tanks, and the light isotopes travel to more-distant sedimentation tanks. By this process, in the case of a sedimentation tank located closer to the first stage, the concentration of heavy isotopes becomes high. In the case of a sedimentation tank located closer to the last stage, the concentration of light isotopes becomes high (refer to FIG. 3A).

If the material is continuously supplied even after the last stage is saturated, the extra supplied material is discharged. The concentration ratio may increase by supplying the discharged material to a next centrifugal separation apparatus so as to be, what we call, cascaded (refer to FIG. 3B).

The supplied material exceeds the volume of the sedimentation tank and travels by the flow so that the material travel to a sedimentation tank 3 as a next stage is performed. In particular, in the case of the enrichment in the solid state, the plastic flow phenomenon induced by a strong centrifugal force is utilized for the transfer of material as an unexampled transferring method in the world.

Figure 2B:
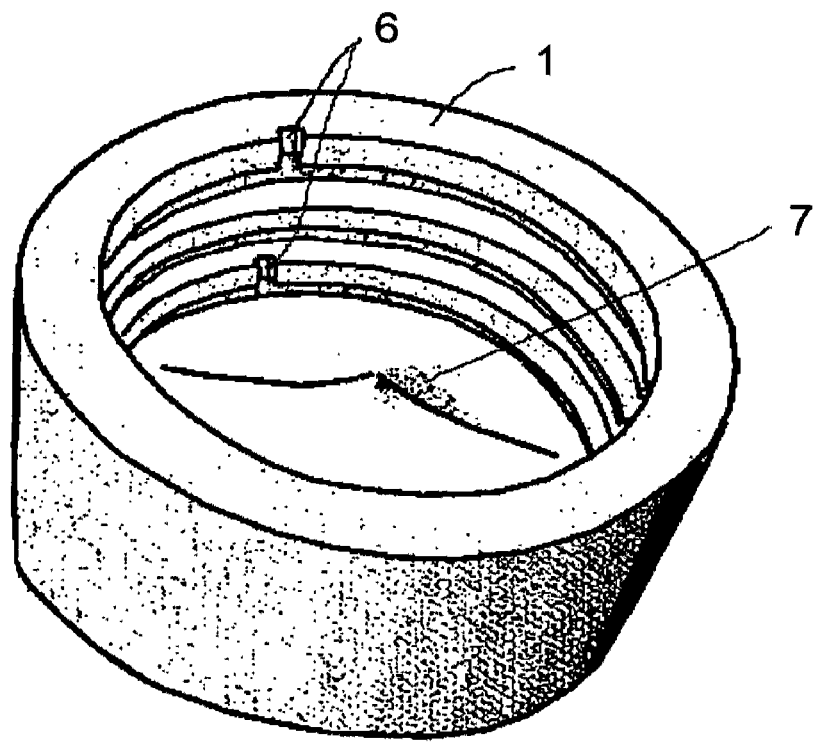
FIG. 2B is a perspective view for clearly and particularly illustrating a connecting channel in the rotor with a power axis lowly placed.

The description will be made in detail with reference to the perspective view shown in FIG. 2B. Connecting channels 6a, 6b, and 6c are provided in the position, for example, 180° C. symmetric to a wall between sedimentation tanks of a rotor 1. When the material is induced to flow to a next-stage sedimentation tank from there, a channel from the flow to each sedimentation tank to the discharge may become the longest so that the concentration efficiency may increase. Finally, after all the sedimentation tanks are filled, the extra supplied material is discharged outside the rotor 1 through the connecting channel 6C. While the material travels from a sedimentation tank 2 to a sedimentation tank 3, and then from the sedimentation tank 3 to a sedimentation tank 4 by the flow phenomenon in the previous process, there is a high tendency that the heavy isotopes are sedimented and remain in the sedimentation tanks by the sedimentation phenomenon of atoms by the strong centrifugal force, and the light isotopes is discharged outside the rotor 1. By performing this process for a long time, the heavy isotopes remain in each sedimentation tank, and the material containing the light isotopes a lot is discharged outside the rotor so that the enrichment of isotopes may be performed.

The material containing heavy isotopes a lot is discharged from the rotor, and the material containing light isotopes a lot and discharged outside from the rotor which is provided with one or more sedimentation tanks is circulated again to the same rotor so that the concentration efficiency may be improved. In this case, the new material is supplied correspondingly to the discharged material containing heavy isotopes, and the discharged material containing the heavy isotopes is supplied to the other rotor so that the efficiency is improved.

As a method of taking out the heavy isotopes, when the last sedimentation tank is saturated as described in the previous paragraph (0104), there are possible methods for taking out the heavy isotopes by opening and closing a bulb provided at each sedimentation tank during the operation, and by decreasing rotation, or stopping the operation for opening the bulb so as to taking out the heavy isotopes from the central direction. If the material is in the liquid state, for example, the rotation speed of the rotor once decreases, and the liquid accumulated in each sedimentation tank is separately scooped. Thus, the material having different concentration ratios may be collected such that there are many heavy isotopes as closer to the first stage, and there are many light isotopes as closer to the last sedimentation tank.

In the case where the material is in the solid state or it is possible to change the material into the solid state by decreasing the temperature, for example, the rotation speed of the rotor once decreases and the material accumulated in each sedimentation tank is removed by using an apparatus for internal grinding. Thus, the material having different concentration ratios may be collected such that there are many heavy isotopes as closer to the first stage, and there are many light isotopes as closer to the last sedimentation tank. It is also possible that the solidified material is dissolved for each sedimentation tank by stopping the rotation and taken out.

When the centrifugal process is continued even after the last sedimentation tank is saturated as described in the previous paragraph (0104), the material containing the light isotopes a lot is discharged when the material is supplied. Thus, the discharged material may be collected. The heavy isotope elements may be taken out by using the method as described before. In the case of the material which may be enriched under a relatively-low acceleration field, for example, a bulb openable and closable during the rotation or a thing like that is provided at the bottom of the sedimentation tank, and the material is taken out for each sedimentation tank.

Cascading is possible by using a plurality of centrifuges.

Because the atomic volumes are the same in isotopes, the gradient in the isotope abundance ratio becomes as a constant straight line in the state (normal state) where the centrifugal process is sufficiently performed. Thus, the depth of the sedimentation tank is made as large as possible so as to increase the concentration ratio.

When the material to be processed is liquid, there is a possibility of reflux of the enriched portion, if the distance from the rotational axis to the exit (bottom of the connecting channels 6a, 6b, and 6c) of each sedimentation tank in the multistage rotor is the same. Thus, the distance is made to become larger in a step-like shape so as to prevent the reflux.

In each sedimentation tank, when the temperature is higher at the rotational center in comparison with the outer periphery side of the rotor, there is a risk that the enrichment by sedimentation is disturbed due to generation of macro-convection. It is necessary to control the temperature of the rotor including that the temperature of the rotational center is made higher in comparison with the outer periphery side of the rotor.

From the sedimentation theory of atoms and the experimental results hitherto, it is understood that the diffusion coefficient of atoms under the strong acceleration field is faster than a typical diffusion coefficient. From this reason, even if the temperature decreases after the centrifugal process and the centrifugal force is removed, the enriched body may be collected while maintaining the gradient of the isotopes abundance ratio. This technique is based on the assumption that a supercentrifuge capable of obtaining a sufficient centrifugal acceleration field and temperature conditions is used. So far, a supercentrifuge having the features satisfying these conditions has been developed only by Kumamoto University and Japan Atomic Energy Agency (former Japan Atomic Energy Research Institute).

A method of supplying the material to a rotor is necessarily changed according to the direction of the rotor-fixing axis of the centrifuge, and some devices on the design of the rotor are necessary. Specifically, the devices are necessary depending on the types of the centrifuge, whether it is by using a rotor hung, by using a rotor placed on a thing, or by using a rotor tilted from a vertical (−90°<rotational axis<−90°). In consideration that the gravity in nature is directed downward, in the case of the centrifuge using a rotor placed in a direction as shown in FIG. 2A, if the material of the solution or the grain-form is supplied to the rotor 1 by using a method of dripping or falling, the material travels to a sedimentation tank A (first stage) by the centrifugal force. A rotor bottom 7 as a drip surface is cone shaped for providing a slope for a purpose of supporting the material travel to the sedimentation tank A (first stage) in an outer periphery direction after the drip.

Figure 5A:
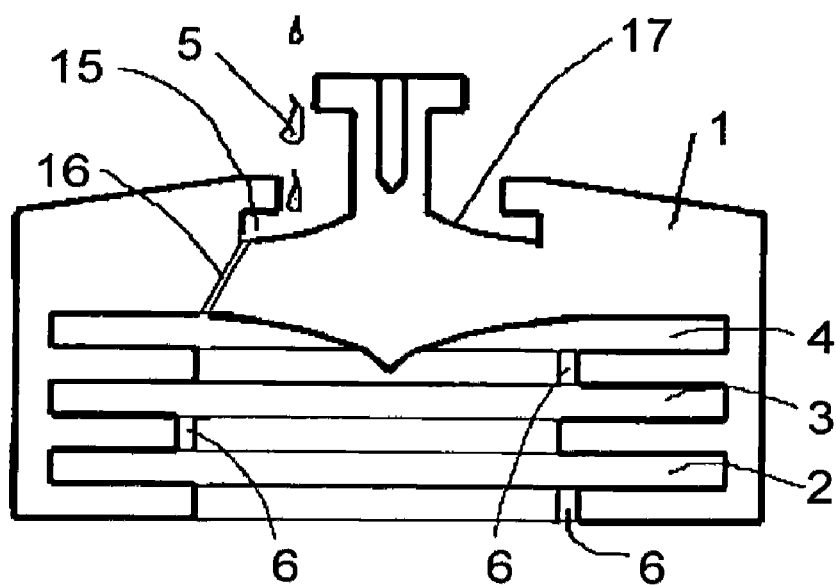
FIG. 5A is a vertical cross-sectional view illustrating pores for guiding to a drop receiver and a first sedimentation tank in a rotor with a power axis highly placed.
Figure 5B:
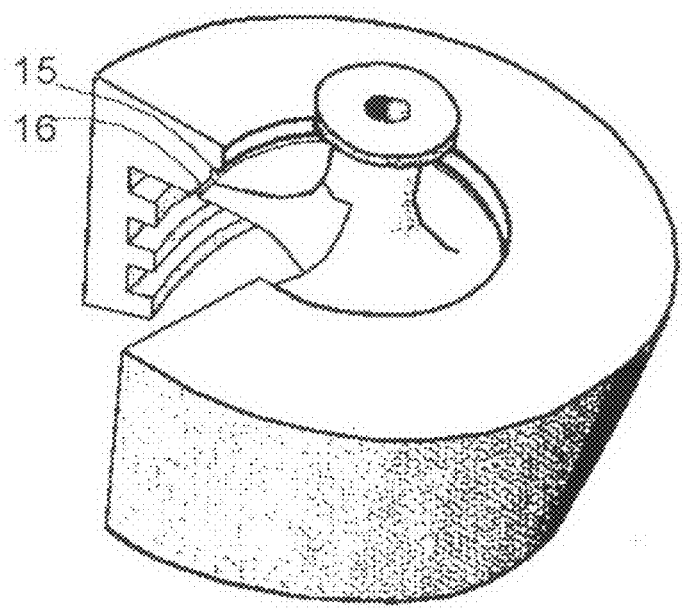
FIG. 5B is a perspective view illustrating a connection relationship between the first sedimentation tank and the pores in the rotor with the power axis highly placed.

In the same manner, in the case where the rotor is used in a condition that the rotor is hung in a direction of FIG. 5A (cross-sectional view) in consideration that the gravity in nature is directed downward, a drip receiver 15 for supplying the material to the upper part of the rotor is provided, and the sample of the solution or the grain-form is dripped or fallen. Thus, the material held to the wall face by the centrifugal force is supplied to the sedimentation tank A (first stage) in the rotor through a pore 16 by using the flow phenomenon, or, in particular in the case of the solid, by using the plastic flow phenomenon. Here, the method using the plastic flow phenomenon for material travel is an unexampled transferring method, the plastic flow phenomenon induced by a stress by the centrifugal force. Because the drip surface supports the material travel to the drip receiver 15 in the outer periphery direction after the drip, the drip surface is cone shaped with a slope acting in the same way as the rotor bottom 7. In the case where the drip receiver 15 is not provided, for example, the material of the fusion material is injected to the sedimentation tank A by using a pump or the like, misted, and the like.

In the same manner, in the case of the centrifuge using the rotor tilted from a vertical (−90°<rotational axis<90°), in consideration that the gravity in nature is directed downward, the rotor having the same shape as in FIG. 2A is tilted and used, and the sample of the solution or the grain-form is supplied to the sedimentation tank A by using a method of dripping, falling, or the like.

The composition modification or the plastic flow as one of unusual phenomena shown under a strong centrifugal acceleration field is actively used as a unique method of the material travel so that the material travel in the solid state in the rotor in the enrichment process is improved (refer to FIGS. 3A, 3B, and 3C). In the same manner as the liquid flow, the material is additionally supplied by dripping. Thus, it is an image such that the extra material is overspilled to the next sedimentation tank. In the case of the solid, for example, the material travel outside the rotor may be improved by employing a method of supplying the sample of grain-form or the like. However, it is better to employ a method of flowing the material in the liquid state.

The material travel in the liquid state in the rotor in the enrichment process is all performed by the liquid flow. However, it is known that it badly affects the sedimentation of isotopes, because the convection is generated by the temperature difference in the case of the liquid state, and the material is stirred. This may be solved by maintaining the temperature of the rotor constant during the centrifugal process, but it is difficult. In this case, this may be solved by maintaining the temperature of the outer periphery of the rotor lower than that of the inner wall side of the rotor so that the density of the liquid becomes larger as approaching the outer periphery of the rotor. By taking advantage of the features of the bowl-shape of the rotor 1, the heating apparatus of the rotor 1 is provided in space inside the rotor, and a cooling apparatus is provided outside the rotor so that this may be solved.

EXAMPLES

Hereinafter, specific examples of the present invention will be explained in detail. For a supercentrifuge, used was a centrifuge capable of generating a acceleration field of energy of 1,000,000 G level as maximum over a long time at high temperature. Today, a supergravity generator developed by Kumamoto University and Japan Atomic Energy Agency (former Japan Atomic Energy Research Institute) has been an only actual supercentrifuge disclosed in the world, the supercentrifuge capable of realizing the features as the same level as those described above.

Example 1

Simple Substance: Simple Se: Liquid and Solid

As an example that the material to be processed was a single metal, the case where single selenium (Se) was used was introduced. Natural Se was composed of isotopes such as Se (0.9%), Se (9.0%), Se (7.6%), Se (23.5%), Se (49.7%), Se (9.2%) and the like.

As a starting sample, grain sample of 4N—Se (meaning Se with a purity of 99.99%) was dissolved and solidified in a glass tube with an inner diameter of 5 mm under argon atmosphere, and the starting sample was cut as a cylindrical sample with a diameter of 5 mm and a length of 5 mm. A capsule of SUS304 with an inner diameter of 5 mm was filled with this, and the resultant was loaded on a rotor of Ti based alloy with a diameter of 80 mm (refer to FIG. 4).

In the experiment, an air-turbine type supercentrifuge in Japan Atomic Energy Agency, capable of generating a gravity field of 1,000,000 G (1 G=9.8 m/s$^2$) or more over a long time at a high temperature was used. Two types of experiments were conducted for 100 hours, respectively. One was the case where the experimental temperature was set at 190° C. (solid), and the other was the case where the experimental temperature was set at 300° C. (liquid). The analysis of the isotopes was performed by Institute for Study of the Earth's Interior, Okayama University which was located in Mitomo, Okayama Prefecture by using Cameca ims-5f secondary ion mass spectrometry (SIMS). The crystal state was analyzed with electron back scattering pattern (EBSP) by using schottky type FE-SEM (S-43000 Se) of Hitachi Ltd.

Figure 6A:
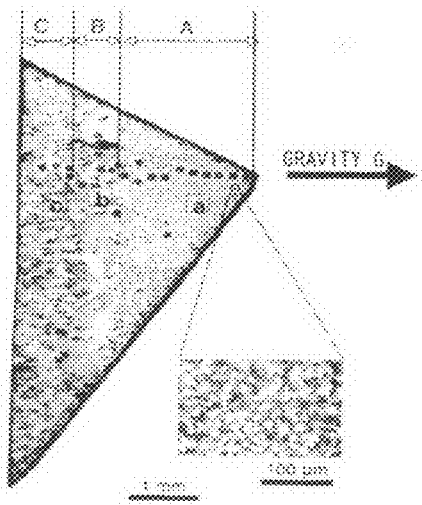
FIG. 6A is a polarizing micrograph of a sample, relating to an experimental result of Se simple sample in a solid phase, where a starting sample is a simple substance composed of $^{74}Se$ (0.87% and $^{76}Se$ 9.02%), $^{77}Se$ (7.58%), $^{78}Se$ (23.52%), $^{80}Se$ (49.82%), $^{82}Se$ (9.19%) in a isotope abundance ratio, and experimental conditions are set as 820,000 G, 190° C., and 100 h.
Figure 6B:
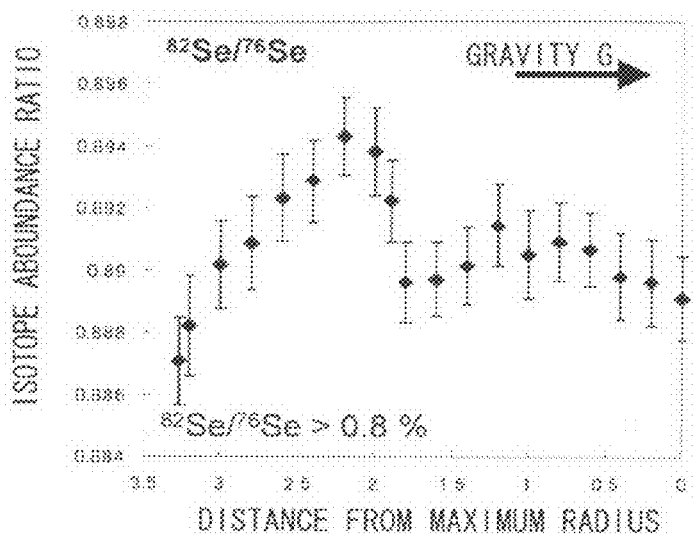
FIG. 6B is a view illustrating a measurement result of the isotope abundance ratio (ratio $^{82}Se/^{76}Se$) of the sample.

The experimental temperature was set at 190° C. (solid state) which was lower than the melting point (222° C.) at normal pressure and the centrifugal process was performed for 100 hours. A polarizing micrograph 6A of the sample in which a face including a rotational axis was cut and the surface was polished, and the isotope abundance ratio $^{82}$Se/$^{76}$Se) were shown in FIG. 6A. A number of rotations of the supercentrifuge was 152,000 per minute. The gravity fields of a right edge and a left edge (35.4 mm and 31.4 mm in radius) of the sample at this time were 916,000 G and 813,000 G, respectively. The sample was roughly divided into regions A, B, and C. As shown in the extended micrograph in FIG. 6A, the completely-fine grain crystal of approximately 10 µm was observed in the strong gravity region A, the crystal with a large grain diameter of a couple of hundreds µm was observed in the middle gravity region B, and the feather pattern growing along the gravity field direction on the surface was observed in the weak gravity region C.

When the isotope abundance ratio was investigated, it was understood that there was an upward gradient of 0.8% or more in the ratio of $^{82}$Se/$^{76}$Se in the regions B and C. These results indicated that sedimentation of the isotopes occurred. Here, the change in the isotope abundance ratio was hardly observed in the region A. This was because there was a difference of the diffusion coefficients between the region A, and the regions B and C. The difference of the diffusion coefficients were brought by the difference of pressures in the same sample, the pressures generated under the centrifugal field. The pressure applied on the sample during the centrifugal process became high towards the right side in the figure, and it was 163 MPa at the right edge (for example, it was similar to that the water pressure became high as diving deeper and deeper).

Similarly to other metals, in Se, the melting point rose with an increase of the pressure, in accordance with a simon equation. Thus, in Se under this pressure, the melting point rose from 220° C. to 257° C. at normal pressure. Accordingly, because the diffusion coefficient became small toward the gravity direction in the sample, the sedimentation started in the weak gravity region, and was spread out to the sedimentation region having more strong gravity. The reaction was observed in only the regions B and C when the experiment time was 100 hours. When the centrifugal process was further continued, the sedimentation occurred in the entire sample, and the concentration change in the isotopes was observed in the entire sample.

According to the result of EBSP (electron back scattering pattern), it was observed that the fine-grain crystal had a random crystal orientation in the strong gravity region (A). In the middle gravity region (B), a conclusion was made that the crystal grew in a vertical direction along a c-axis.

According to the result of EBSP, the crystal orientation of the feather-shaped fine-grain crystal in the low gravity region of the c-axis was almost the same as in the region B. In Se, a self-diffusion coefficient along a vertical direction of the c-axis was 5.2 times larger than that along a horizontal direction of the c-axis. Thereby, the growth of the crystal was preferentially induced along the c-axis direction. As a result, initially, the crystal with very fine grains appeared in the first amorphous sample, and it was thought that the crystal grew through the sedimentation of heavier isotopes.

The experimental temperature was set at 300° C. (liquid state) which was higher than the melting point (222° C.) at normal pressure and the centrifugal process was performed for 100 hours. A polarizing micrograph a) of the sample in which a face including a rotational axis was cut and the surface was polished, the isotope abundance ratio $^{82}Se/^{76}Se$), and the result of composition calculation of the ideal system (gas) were shown in FIG. 7. A number of rotations of the supercentrifuge was 145,000 per minute. The gravity fields of a right edge and a left edge (35.2 mm and 31.2 mm in radius) of the sample at this time were 827,000 G and 733,000 G, respectively.

Figure 7A:
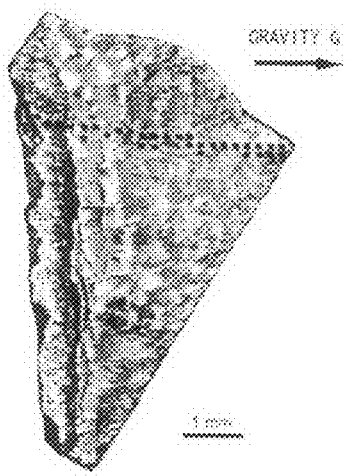
FIG. 7A is a polarizing micrograph of the sample (crystal direction: a axis/gravity direction), relating to an experimental result of Se simple sample in a liquid phase, where the starting sample is the same as shown in FIG. 6A, and the experimental states are set as 820,000 G, 300° C., and 100 h.
Figure 7B:
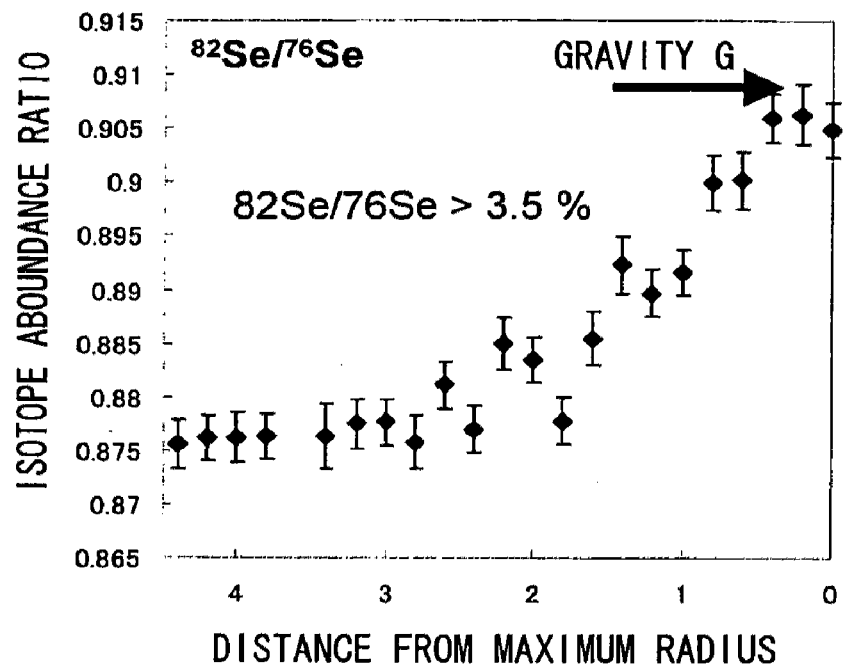
FIG. 7B is a view illustrating a measurement result of the isotope abundance ratio (ratio $^{82}$Se/$^{76}$Se) of the sample.

In this example, there was a gradient of 3.5% or more in the isotope abundance ratio $^{82}Se/^{76}Se$, that is, observed was four times or more of the change in comparison with the centrifugal process in the solid state (refer to FIG. 7). The change in the isotope abundance ratio was seen in the higher gravity region in comparison with the case of the centrifugal process in the solid state. This was probably because, the diffusion coefficient was larger in the simple substance in comparison with the case of the alloy, or the activity coefficient became smaller.

Figure 7C:
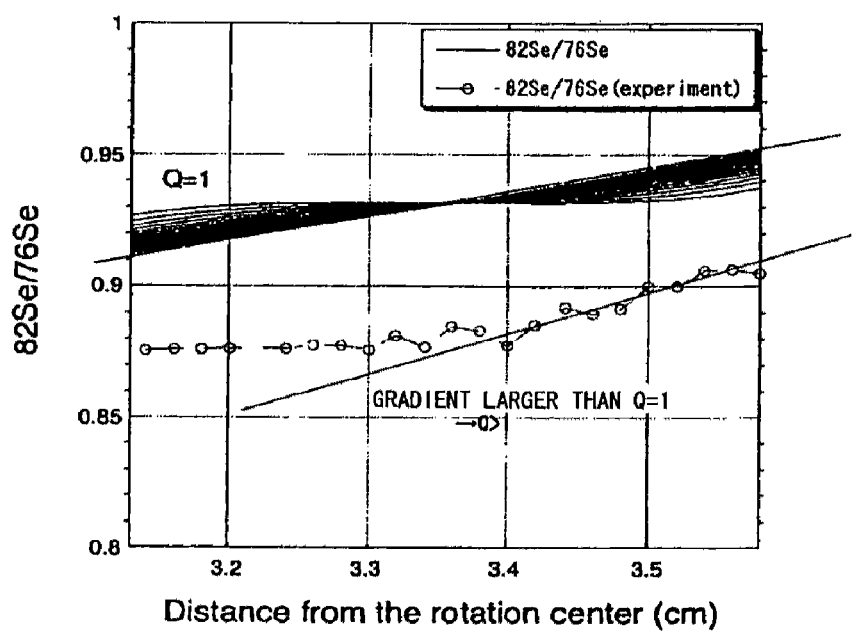
FIG. 7C is a view illustrating an analysis result of the isotope abundance ratio of the sample.

The change in the isotope abundance ratio by a simulation of sedimentation process of the ideal system (gas) by using a diffusion equation of a self-consistent sedimentation was shown in FIG. 7C. The gradient in the isotope abundance ratio in the experimental result was twice larger than that of the normal state (final state) obtained by the simulation.

Unlike the gas state (ideal state) in which the interaction between adjacent atoms might be almost omitted, this indicated that the sedimentation of the isotopes in Se in the condensed state (solid or liquid) occurred as the non-ideal system by the interaction between adjacent atoms. It was thought that the activity coefficient decreased. It was clear that the change in the isotope abundance ratio in the centrifugal process for approximately 100 hours was halfway, and it was thought that a larger gradient in the isotope abundance ratio might be achieved if the process time was extended. This experimental result indicated that the supercentrifugal process of not only Se but also material in the condensed state (single element, multicomponent alloy, compound, and the like) is very effective for separating isotope elements, and the experimental result was strong evidence indicating that this method might be proposed as a new method of isotope enrichment.

Figure 8A:
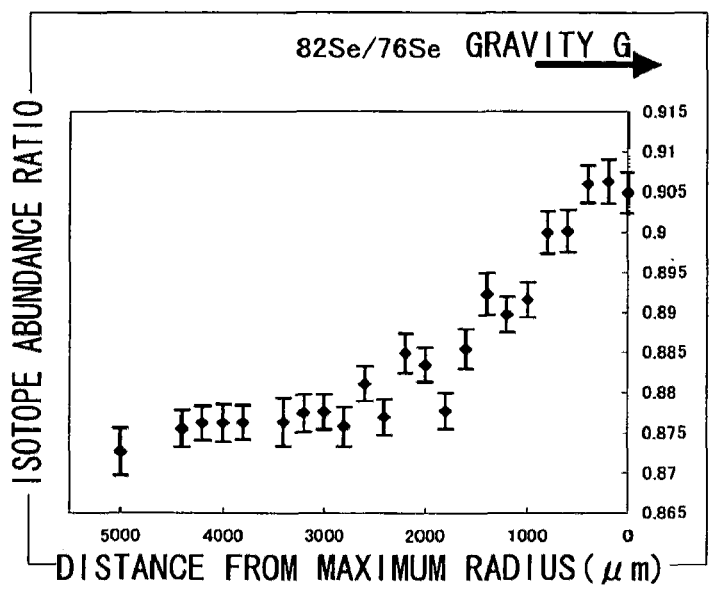
FIG. 8A is a view illustrating a composition analysis result of isotopes of measured isotopes: $^{82}$Se and $^{76}$Se, relating to a measurement of the isotope abundance ratio of two or more types, where the starting sample is simple Se (composed of six or more types of isotopes which is the same as shown in FIG. 6A), and the experimental states are set as 820,000 G, 300° C., and 100 h.
Figure 8B:
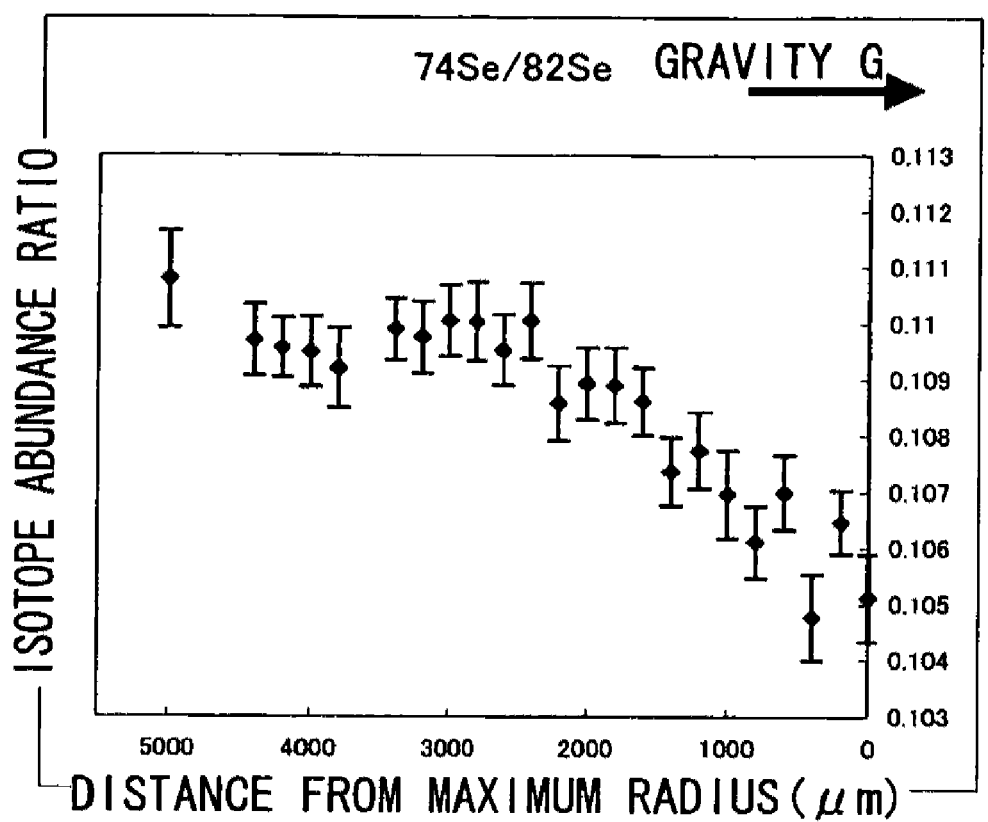
FIG. 8B is a view illustrating composition analysis result of measured isotopes $^{74}$Se and $^{82}$Se, relating to a measurement of isotope abundance ratio of two or more types of isotopes, where the starting sample is simple Se, and experimental states are 820,000 G, 300° C., and 100 h.

The analysis result in the isotope abundance ratio of three components $^{74}Se$, $^{76}Se$, and $^{82}Se$ of the isotope components of the above-mentioned Se was shown in FIG. 8A. The ratio of $^{74}Se/^{82}Se$ largely changed in comparison with the ratio of $^{82}Se/^{76}Se$, and a gradient of the isotope abundance ratio of 4.5% or more was realized in proportion to the difference of the atomic weight. Thus, it was understood that enrichment was possible even in the case where there were isotopes of three components or more.

Example 2

Solid Solution: Se—Te Alloy

As an example that the material to be processed was a solid solution, the case where selenium (Se)-tellurium (Te) alloy was used was introduced. As a starting sample, grain sample of 4N—Se, and 4N—Te (99.99%) was dissolved and solidified in a glass tube with an inner diameter of 4 mm under argon atmosphere, and the starting sample was cut as a cylindrical sample with a diameter of 4 mm and a length of 5 mm. A capsule of SUS304 with an inner diameter of 4 mm was filled with this.

In the experiment, an air-turbine type supercentrifuge in Japan Atomic Energy Agency, capable of generating a gravity field of 1,000,000 G (1 G=9.8 m/s$^2$) or more for a long time at a high temperature was used. The experimental temperature was set at 260° C., and the experimental time was 100 hours. The analysis of the isotopes was performed by Institute for Study of the Earth's Interior, Okayama University which was located in Mitomo, Okayama Prefecture by using Cameca ims-5f secondary ion mass spectrometry (SIMS).

Figure 9A:
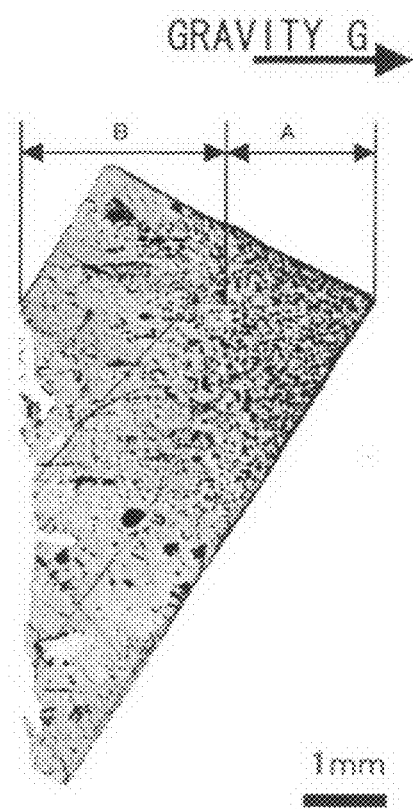
FIG. 9A is a polarizing micrograph, relating to the isotope abundance ratio of Se—Te alloy sample, where the starting sample is Se—Te (70:30 mol %), and experimental states are set as 1.02×10$^6$ G, 260° C., and 100 h.
Figure 9B:
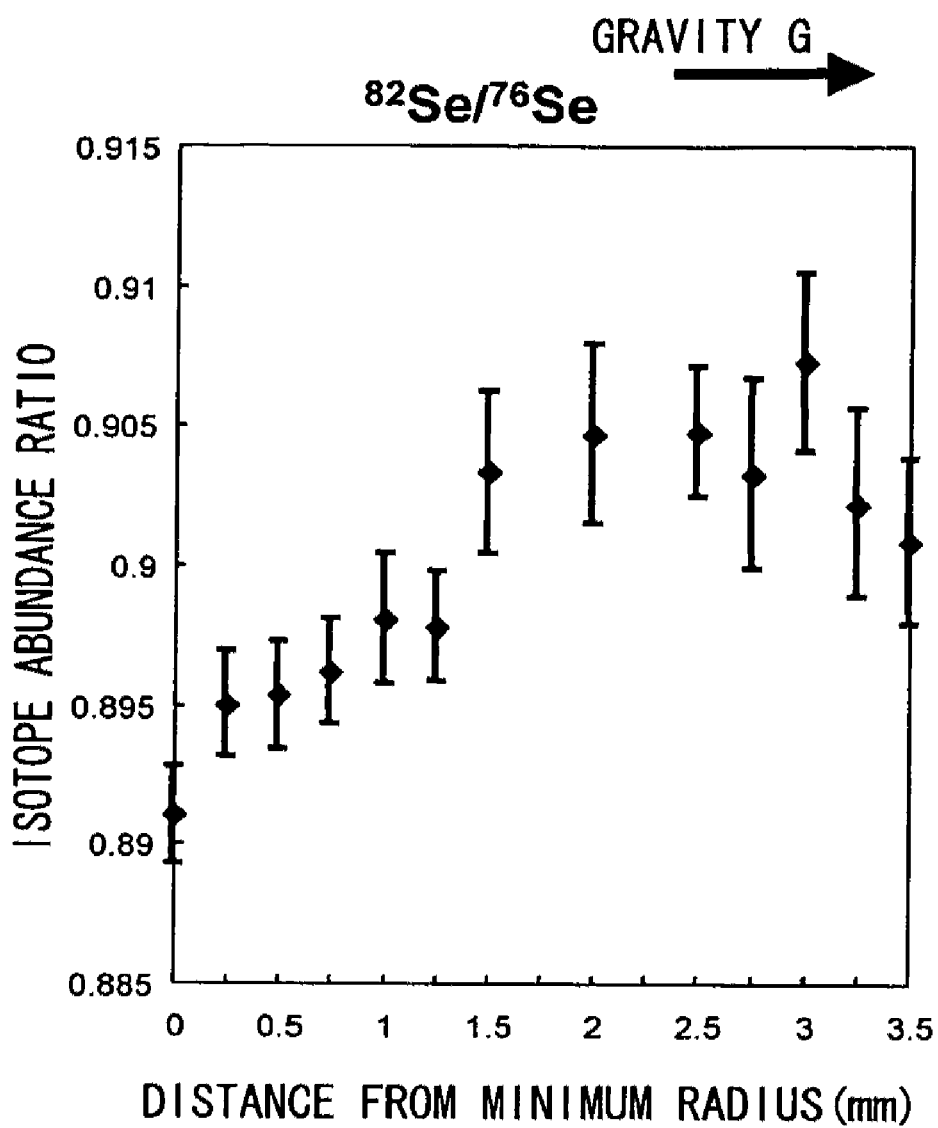
FIG. 9B is a view illustrating a measurement result of the isotope abundance ratio (ratio $^{82}$Se/$^{76}$Se) of the sample.

The experimental temperature was set at 260° C. (solid state) which was lower than the melting point (300° C.) at normal pressure and the centrifugal process was performed for 100 hours. A polarizing micrograph of the sample in which a face including a rotational axis was cut and the surface was polished were shown in FIG. 9A, and the isotope abundance ratio $^{82}Se/^{76}Se$ was shown in FIG. 9B. A number of rotations of the supercentrifuge was 160,000 per minute. The gravity fields of a right edge and a left edge (35.8 mm and 31.3 mm in radius) of the sample at this time were 1,026,000 G and 897,000 G, respectively. The sample was roughly divided into two regions. As shown in the extended micrograph in FIG. 9A, the completely-fine grain crystal of approximately 10 mm was observed in the strong gravity region A, and the crystal grain growing along the gravity field direction was observed in the weak gravity region B. When the isotope abundance ratio of Se was investigated, it was understood that there was an increase of 1.5% or more in the ratio of $^{82}Se/^{76}Se$, as shown in FIG. 9B.

The change in the isotope abundance ratio achieved in this experiment was twice larger in comparison with the case of the experiment using a single metal Se in the solid state introduced in the example 1. From the study hitherto, it was understood that the diffusion coefficient in the solid solution became large under the very-strong centrifugal acceleration field. In accordance with this, it was thought that the change in the isotope abundance ratio became large. This result indicated that more efficient enrichment was possible in ally in comparison with the case of single metal.

Example 3

Halides: Super-Ionic Conductor: Silver Iodide (AgI)

As an example that the material to be processed was a halide and super-ionic conductor, the case where silver iodide (AgI) was used was introduced (experiments 1, 2, and 3). Silver iodide (AgI) had a phase transition point from β-AgI to α-AgI at 148° C. α-AgI was a super-ionic conductor with a very-large diffusion coefficient (approximately $10^{-3}$ cm$^2$/s) of silver ion. The experimental temperature was set at 148° C. or more, and α-AgI was placed under the strong centrifugal acceleration field so that high-speed sedimentation phenomenon of Ag atoms in α-AgI might be expected. The experiment was conducted in consideration that the experimental temperature was set at 148° C. or less before removing the gravity so that the sample with the fixed isotope abundance ratio might be collected. The melting point was 555° C. In the experiment, an air-turbine type supercentrifuge in Japan Atomic Energy Agency, capable of generating a gravity field of 1,000,000 G (1 G=9.8 m/s$^2$) or more for a long time at a high temperature was used. The analysis of the isotopes was performed by Institute for Study of the Earth's Interior, Okayama University which was located in Mitomo, Okayama Prefecture by using Cameca ims-5f secondary ion mass spectrometry.

Experiment 1

Figure 1C:
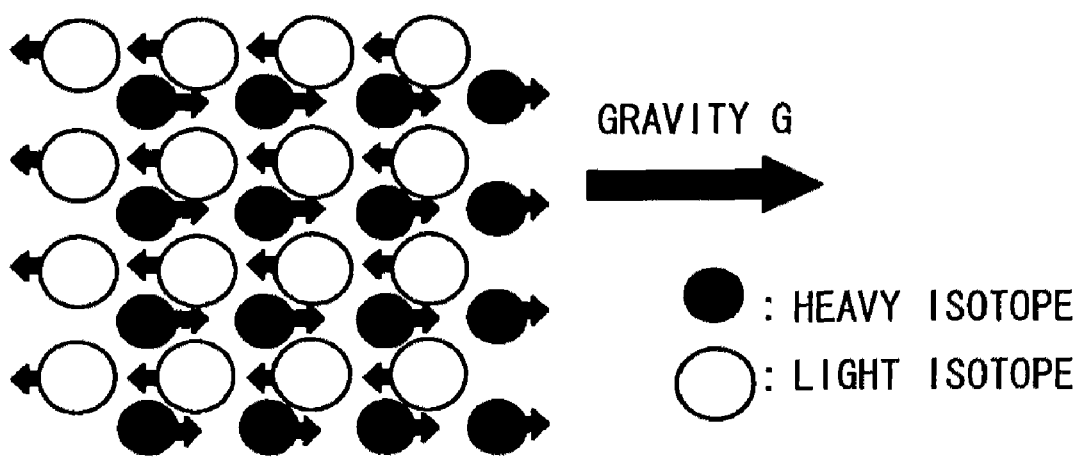
FIG. 1C is a view schematically illustrating the state of the atomic scale under a high-gravity field of the condensed material, and force applied to atoms.
Figure 1D:
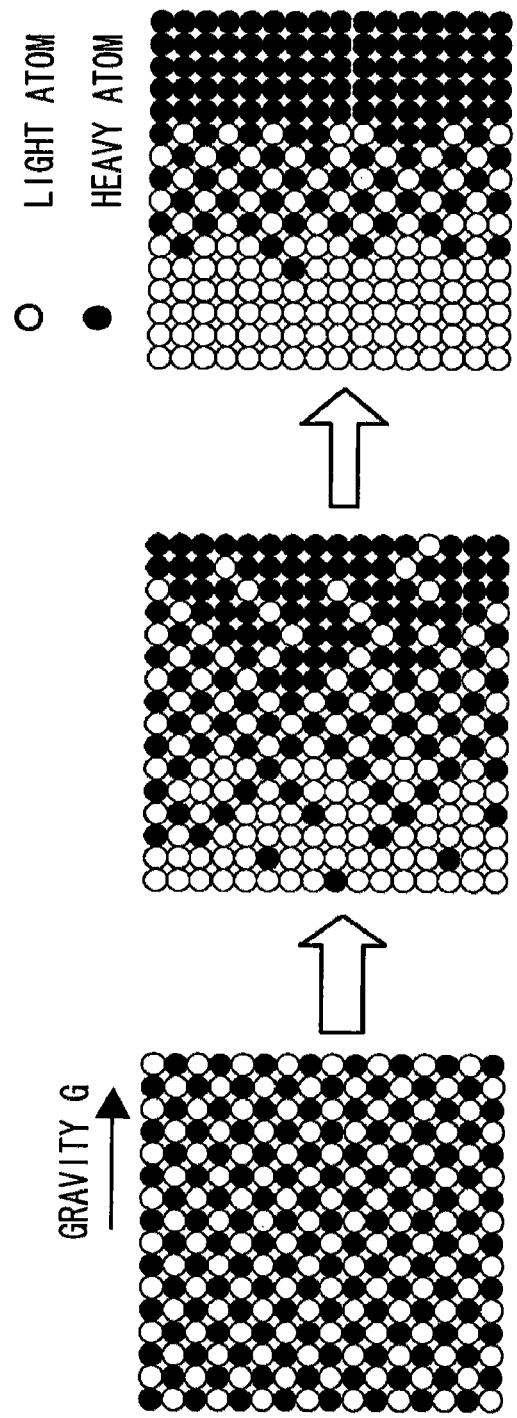
FIG. 1D is a view schematically illustrating sedimentation process of atoms, when a potential energy by a gravity of the condensed material overcomes a chemical potential so that sedimentation of atoms occurs (in this case, activation process).
Figure 10A:
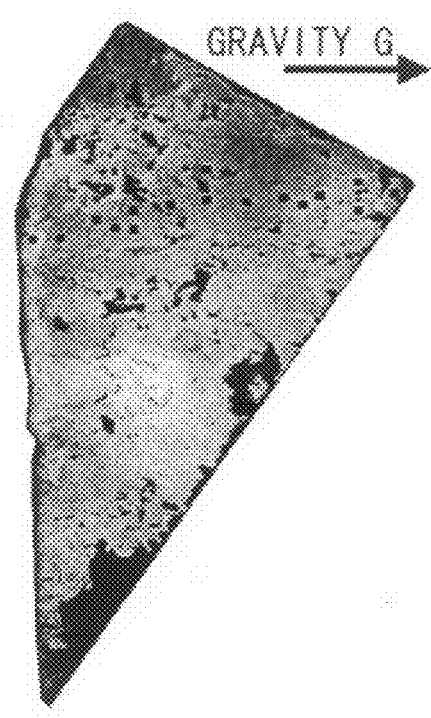
FIG. 10A is a polarizing micrograph after measuring the isotope abundance ratio of AgI solid sample (260° C. and 100 h).
Figure 10B:
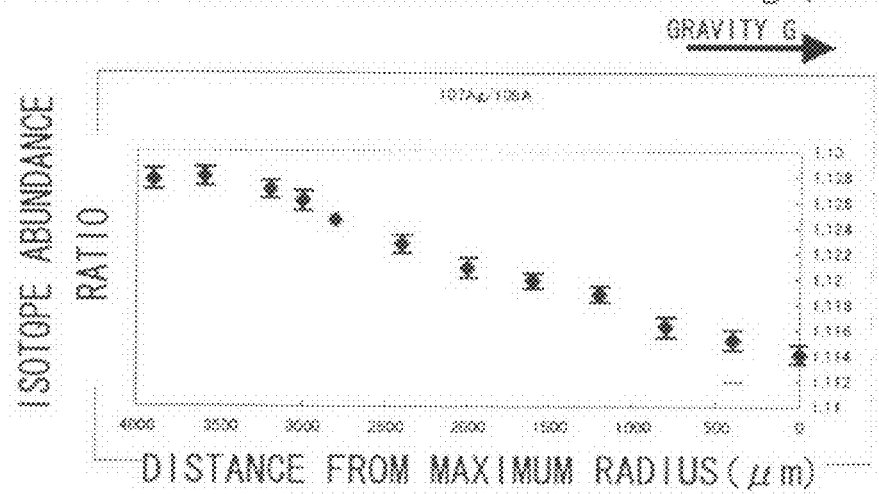
FIG. 10B is a view illustrating a measurement result of the isotope abundance ratio (ratio $^{107}$Ag/$^{109}$Ag) of the sample.
Figure 10C:
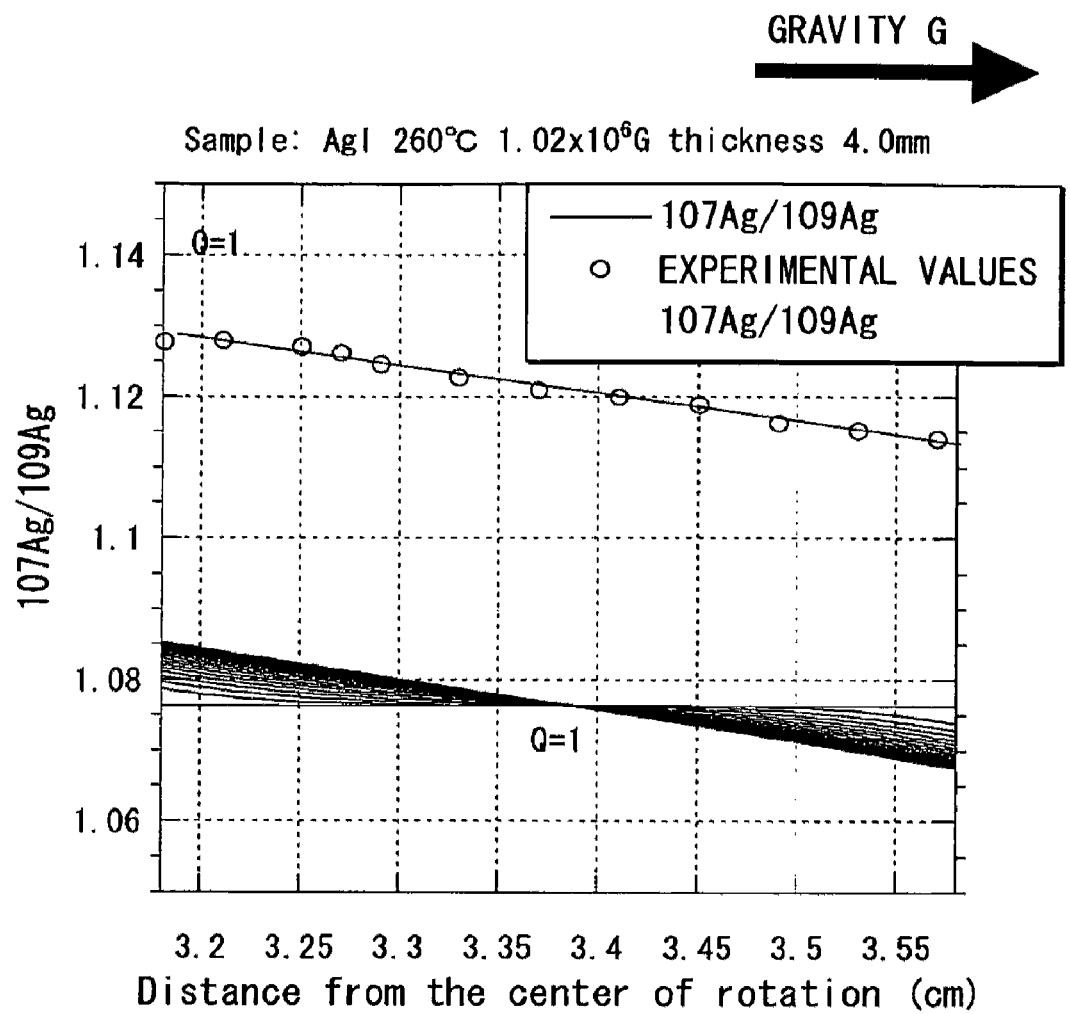
FIG. 10C is a view illustrating an analysis result of the isotope abundance ratio of the sample.

The experimental conditions were as follows. The gravity field in the maximum radius of the sample was 1,020,000 G (1 G=9.8 m/s$^2$), the experimental temperature was set at 260° C., and the experimental time was 100 hours. In the case of AgI, it was the solid phase if it was a phase (148° C. or more). In this case, the diffusion coefficient was higher in the solid phase than that in the liquid phase, and hardly changed up to the melting point. Thus, sedimentation of atoms occurred at a very low temperature in comparison with the case of other materials, and the isotope abundance ratio changed. As a starting sample, powder sample of silver iodide was dissolved and solidified in a glass tube with an inner diameter of 5 mm, and the starting sample was cut as a cylindrical sample with a diameter of 5 mm and a length of 5 mm. A capsule of SUS304 with an inner diameter of 5 mm was filled with this and used. A polarizing micrograph of the sample in which a face including a rotational axis was cut and the surface was polished was shown in FIG. 10A, the isotope abundance ratio $^{107}$Ag/$^{109}$Ag was shown in FIG. 10B, and the result of composition calculation of the ideal system (gas) was shown in FIG. 1C. No deposits and the like were observed in the optical micrograph of the cross section of the sample after the experiment. No concentration change and the like of, in particular, Ag and I (iodine) were observed in the composition analysis by EPMA.

Figure 11A:
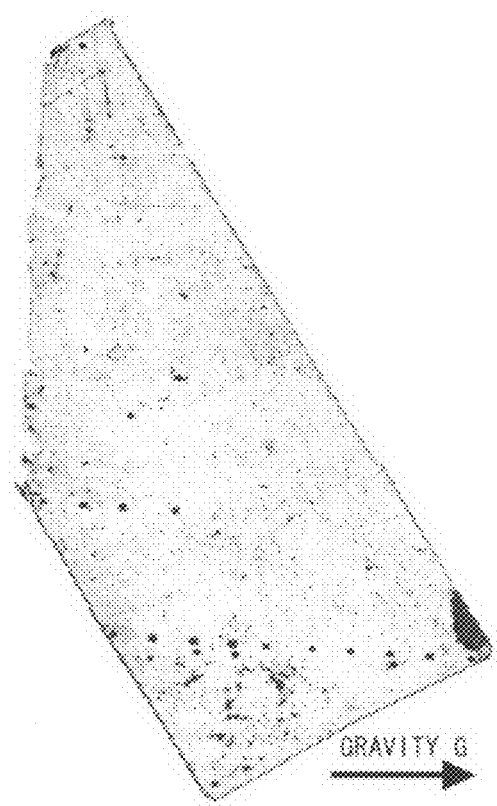
FIG. 11A is a polarizing micrograph after measuring the isotope abundance ratio of AgI solid sample (350° C. and 100 h).
Figure 11B:
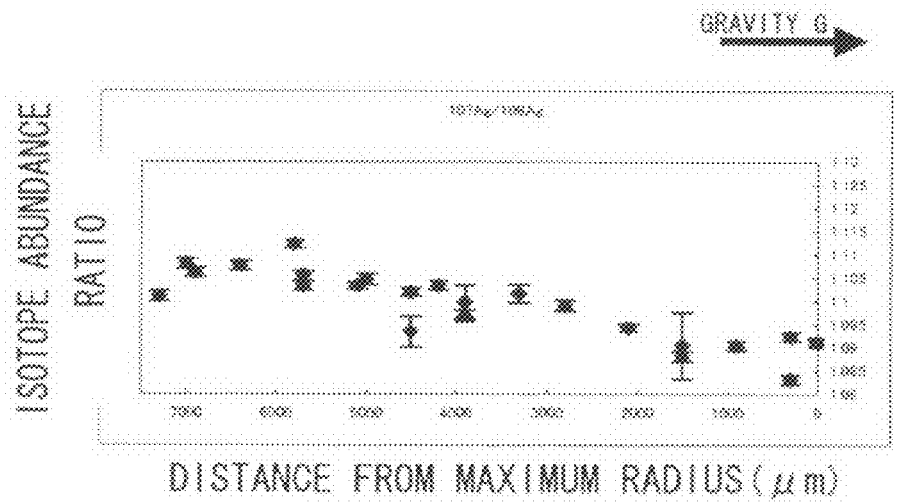
FIG. 11B is a view illustrating a measurement result of the isotope abundance ratio (ratio $^{107}$Ag/$^{109}$Ag) of the sample.
Figure 11C:
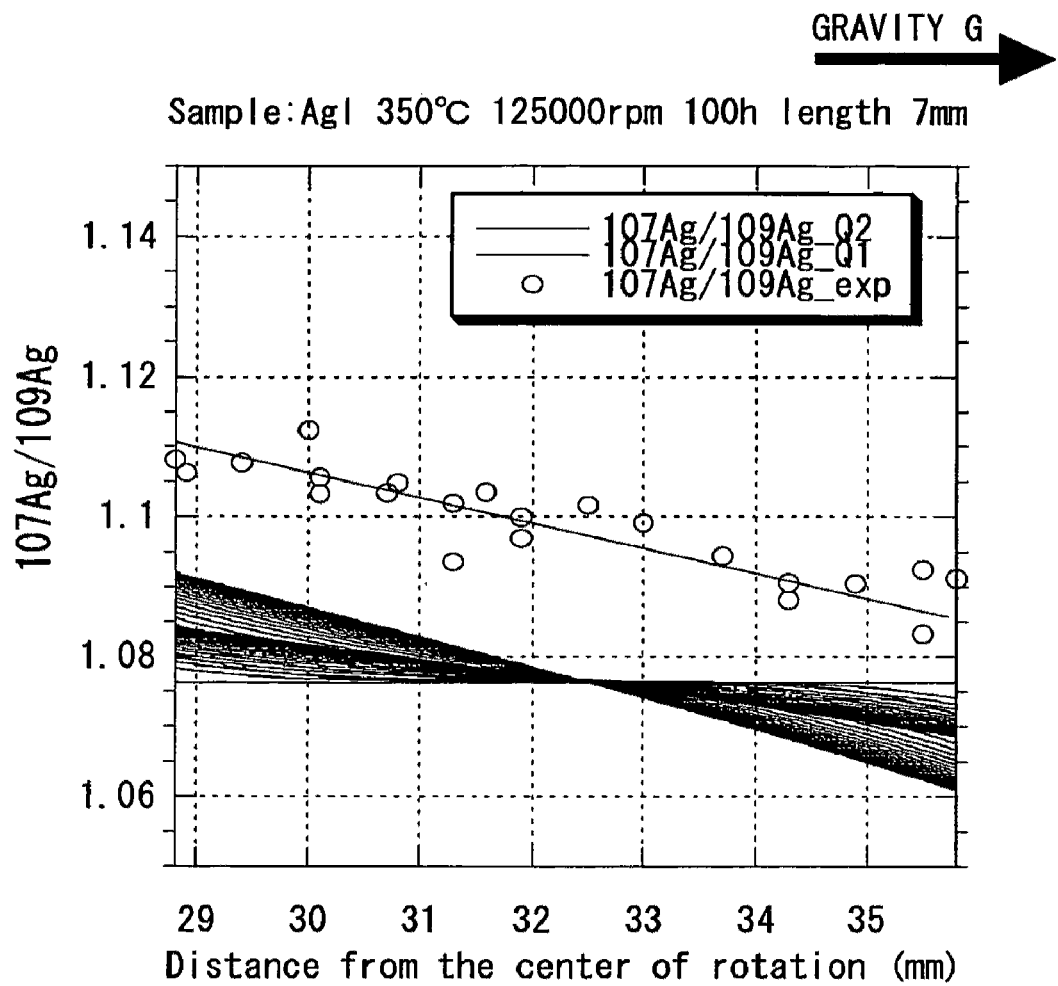
FIG. 11C is a view illustrating an analysis result of the isotope abundance ratio of the sample.

Ag was composed of two isotopes, $^{107}$Ag and $^{109}$Ag. The isotope abundance ratio in a direction horizontal to the gravity was investigated using SIMS. As a result, there was a gradient in the isotope abundance ratio such that heavy $^{109}$Ag increased in a direction of the strong gravity. The change in the isotope abundance ratio by a simulation of sedimentation process of the ideal system (gas) by using a diffusion equation of a self-consistent sedimentation was shown in FIG. 11C. The gradient of the isotope abundance ratio in the experimental result was 1.5 times larger than that of the normal state (final state) obtained by the simulation. This result was one of the examples where the sufficient enrichment was possible even in the solid state.

Experiment 2

The experimental conditions were as follows. The gravity field in the maximum radius of the sample was 620,000 G (1 G=9.8 m/s$^2$), the experimental temperature was set at 350° C., and the experimental time was 100 hours. As a starting sample, powder sample of silver iodide was dissolved and solidified in a glass tube with an inner diameter of 5 mm, and the starting sample was cut as a cylindrical sample with a diameter of 5 mm and a length of 10 mm. A capsule of SUS304 with an inner diameter of 5 mm was filled with this and used. A polarizing micrograph a) of the sample in which a face including a rotational axis was cut and the surface was polished, the isotope abundance ratio $^{107}$Ag/$^{109}$Agb), the result of composition calculation c) in the ideal system (gas) were shown in FIG. 11. Deposits in the gravity direction were observed in the optical micrograph of the cross section of the sample after the experiment. However, it was confirmed in the composition analysis by EPMA that this was deposited Ag. The isotope abundance ratio in a direction horizontal to the gravity was investigated using SIMS. As a result, there was a gradient in the isotope abundance ratio such that heavy $^{109}$Ag increased in a direction of the strong gravity. It was notable that the gradient in the isotope abundance ratio was achieved even in the gravity field which was realized by the general-purpose supercentrifuge, and this result indicated that an industrial use might be put in perspective.

Experiment 3

Figure 12A:
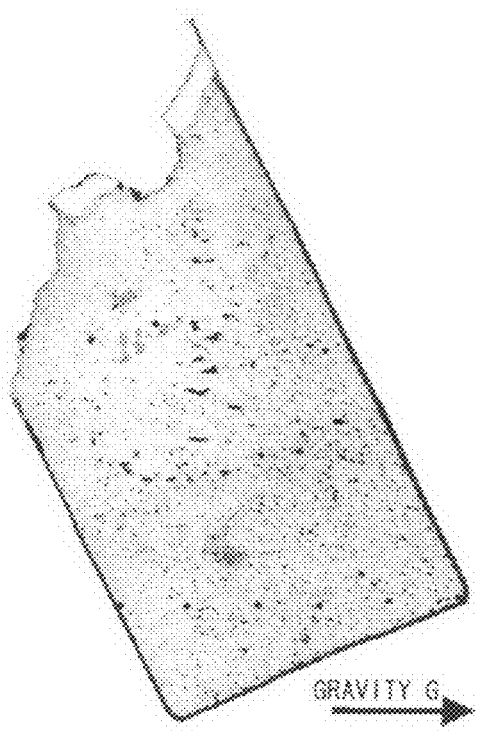
FIG. 12A is a polarizing micrograph after measuring the isotope abundance ratio of AgI solid sample (350° C. and 24 h).
Figure 12B:
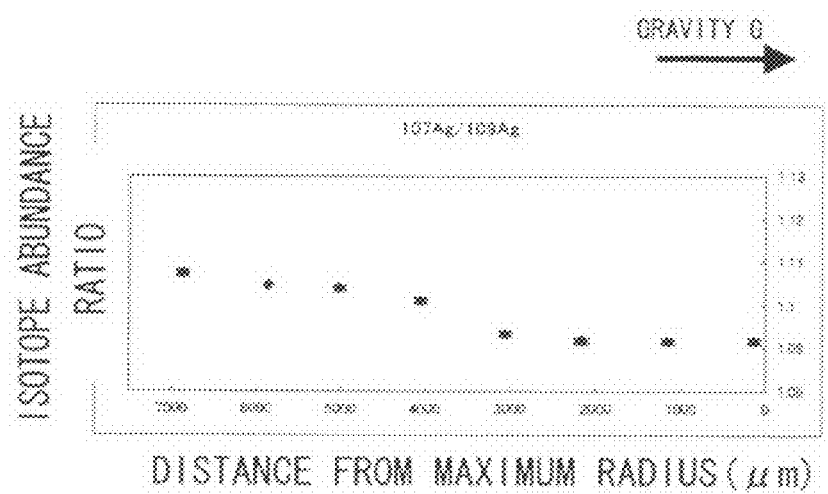
FIG. 12B is a view illustrating a measurement result of the isotope abundance ratio (ratio $^{107}$Ag/$^{109}$Ag) of the sample.

The process time was shortened in comparison with experiment 2, and the experiment was conducted for the purpose of investigating the time-dependency. The gravity field in the maximum radius of the sample was 620,000 G (1 G=9.8 M/s$^2$), the experimental temperature was set at 350° C., and the experimental time was 24 hours. As a starting sample, powder sample of silver iodide was dissolved and solidified in a glass tube with an inner diameter of 5 mm, and the starting sample was cut as a cylindrical sample with a diameter of 5 mm and a length of 10 mm. A capsule of SUS304 with an inner diameter of 5 mm was filled with this and used. A polarizing micrograph of the sample in which a face including a rotational axis was cut and the surface was polished was shown in FIG. 12A, and the isotope abundance ratio $^{107}$Ag/$^{109}$Agb) was shown in FIG. 12B. In experiment 2, the deposits of Ag in the gravity direction were observed in the optical micrograph of the cross section of the sample after the experiment. However, there were no deposits observed in experiment 3. The isotope abundance ratio in a direction horizontal to the gravity was investigated using SIMS. As a result, there was a gradient in the isotope abundance ratio, which was approximately the same level as that in experiment 2. This result indicated that sedimentation of the isotopes of super-ionic conductor AgI was fast, and efficient enrichment in a short time was possible by using the super-ionic conductor.

Example 4

Halide/Super-Ionic Conductor: Copper Iodide (CuI): Solid

As an example that the material to be processed was a halide and super-ionic conductor, the case where copper iodide (CuI) was used was introduced. The melting point was 605° C. In the experiment of silver iodide (AgI) described above, the experiment was conducted in α-AgI where high-speed diffusion might be expected, in consideration that the sample with the fixed isotope abundance ratio might be collected by bringing α-AgI back to β-AgI before removing the gravity. However, in the case of CuI, the experiment was conducted under a condition that there was no phase transition. In the experiment, an air-turbine type supercentrifuge in Japan Atomic Energy Agency, capable of generating a gravity field of 1,000,000 G (1 G=9.8 m/s$^2$) or more for 100 hours or more at a high temperature was used. The analysis of the isotopes was performed by Institute for Study of the Earth's Interior, Okayama University which is located in Mitomo, Okayama Prefecture by using secondary Cameca ims-5f ion mass spectrometry (SIMS).

Experiment 1

Figure 13A:
FIG. 13A is a polarizing micrograph after measuring the isotope abundance ratio of CuI solid sample (350° C. and 100 h).
Figure 13B:
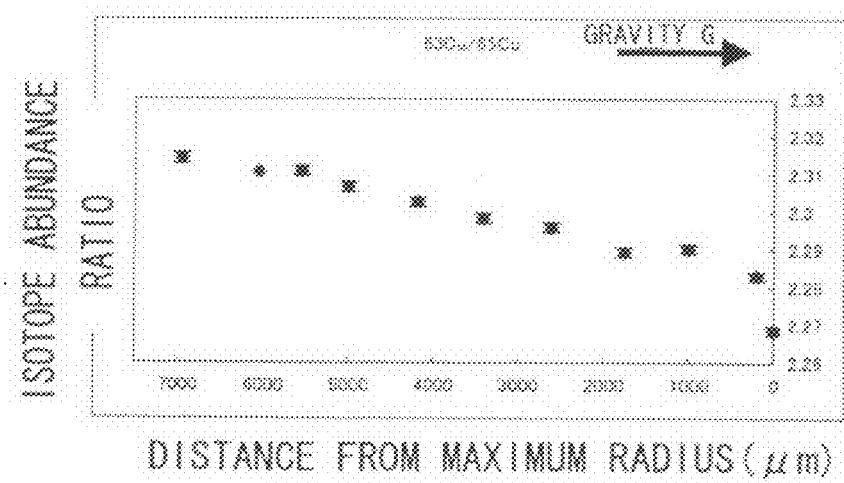
FIG. 13B is a view illustrating a measurement result of the isotope abundance ratio (ratio $^{63}$Cu/$^{65}$Cu) of the sample.

The experimental conditions were as follows. The gravity field in the maximum radius of the sample was 620,000 G (1 G=9.8 m/s$^2$), the experimental temperature was set at 350° C., and the experimental time was 100 hours. As a starting sample, powder sample was dissolved and solidified in a glass tube with an inner diameter of 5 mm, and the starting sample was cut as a cylindrical sample with a length of 11 mm and a diameter of 5 mm. A capsule of SUS304 with an inner diameter of 5 mm was filled with this and used. A polarizing micrograph a) of the sample in which a face including a rotational axis was cut and the surface was polished, and the isotope abundance ratio $^{63}$Cu/$^{65}$Cub) were shown in FIG. 13. Deposits in the gravity direction were observed in the optical micrograph of the cross section of the sample after the experiment. However, it was confirmed in the composition analysis of EPMA that these were deposited Cu by sedimentation of atoms. Cu was composed of two isotopes, $^{63}$Cu and $^{65}$Cu. The isotope abundance ratio in a direction horizontal to the gravity was investigated using SIMS. As a result, there was a gradient in the isotope abundance ratio such that heavy $^{65}$Cu increased in a direction of the strong gravity. It was notable that the gradient in the isotope abundance ratio was achieved even in the gravity field of approximately 650,000 G which was realized by the general-purpose supercentrifuge, and the part of the gravity field with the weak gravity was 500,000 G or less. This result indicated that an industrial use might be put in perspective.

Experiment 2

Figure 14A:
FIG. 14A is a polarizing micrograph after measuring the isotope abundance ratio of CuI solid sample (350° C. and 24 h).
Figure 14B:
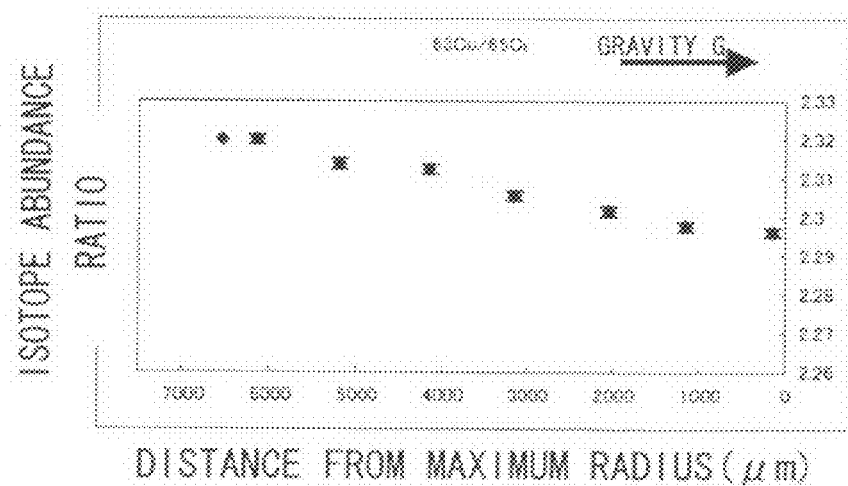
FIG. 14B is a view illustrating a measurement result of the isotope abundance ratio (ratio $^{63}$Cu/$^{65}$Cu) of the sample.

The process time was shortened in comparison with experiment 1, and the experiment was conducted for the purpose of investigating the time-dependency. The gravity field in the maximum radius of the sample was 620,000 G (1 G=9.8 m/s$^2$), the experimental temperature was set at 350° C., and the experimental time was 24 hours. As a starting sample, powder sample was dissolved and solidified in a glass tube with an inner diameter of 5 mm, and the starting sample was cut as a cylindrical sample with a length of 11 mm and a diameter of 5 mm. A capsule of SUS304 with an inner diameter of 5 mm was filled with this and used. A polarizing micrograph of the sample in which a face including a rotational axis was cut and the surface was polished was shown in FIG. 14A, and the isotope abundance ratio $^{63}$Cu/$^{65}$Cub was shown in FIG. 14B. In experiment 1, the deposits of Cu in the gravity direction were observed in the optical micrograph of the cross section of the sample after the experiment. However, there were no deposits observed in experiment 2. The isotope abundance ratio in a direction horizontal to the gravity was investigated using SIMS. As a result, although it is not beyond what was shown in experiment 1, there was a gradient in the isotope abundance ratio, which was approximately the same level as that in experiment 1. This result indicated that sedimentation of the isotopes of super-ionic conductor CuI was fast, and efficient enrichment in a short time was possible by using the super-ionic conductor.

Hereinbefore, the examples of halide and super-ionic conductor were described with the experimental results of AgI and CuI. In brief, the findings were obtained that the sedimentation of the isotopes was realized under the gravity field of approximately 500,000 G, and, moreover, the short-time process was possible. These results indicated that industrial use of the present invention was also possible by improving the general-purpose centrifuge.

Example 5

InPb Based: Solid Solution and Mixed Phase of Solid and Liquid

As an example that the material to be processed was a solid solution or a solution, two experiments (experiments 1 and 2) where In—Pb type solid solution was used were introduced. In the experiment, an air-turbine type supercentrifuge in Japan Atomic Energy Agency, capable of generating a gravity field of 1,000,000 G (1 G=9.8 M/s$^2$) or more for 100 hours or more at a high temperature was used. The analysis of the isotopes was performed by Institute for Study of the Earth's Interior, Okayama University which is located in Mitomo, Okayama Prefecture by using Cameca ims-5f secondary ion mass spectrometry (SIMS).

Experiment 1

Solid State

The experimental conditions were as follows. The gravity field in the maximum radius of the sample was 820,000 G (1 G=9.8 m/s$^2$), the experimental temperature was set at 150° C. (solid state) which was below the melting point (156° C.) at normal pressure, and the experimental time was 100 hours. As a starting sample, grain sample was dissolved and solidified in a test tube, and the starting sample was cut as a cylindrical sample with a length of 5 mm and a diameter of 5 mm. A capsule of Ti based alloy with an inner diameter of 5 mm was filled with this and used. A polarizing micrograph of the sample in which a face including a rotational axis was cut and the surface was polished was shown in FIG. 15A, and the isotope abundance ratio $^{113}$In/$^{115}$In was shown in FIG. 15B.

From the results of composition analysis and structure analysis obtained after the experiment, it was confirmed that an inclined structure of an atom scale was formed such that the heavy Pb atoms inclined in the gravity direction. In was composed of two isotopes, $^{113}$In and $^{115}$In. The isotope abundance ratio in a direction horizontal to the gravity was investigated using SIMS. As a result, there was a gradient in the isotope abundance ratio such that heavy $^{115}$In increased in a direction of the strong gravity.

Experiment 2

Mixed Phase of Solid State and Liquid State

The experimental conditions were as follows. The gravity field in the maximum radius of the sample was 810,000 G (1

Figure 16A:
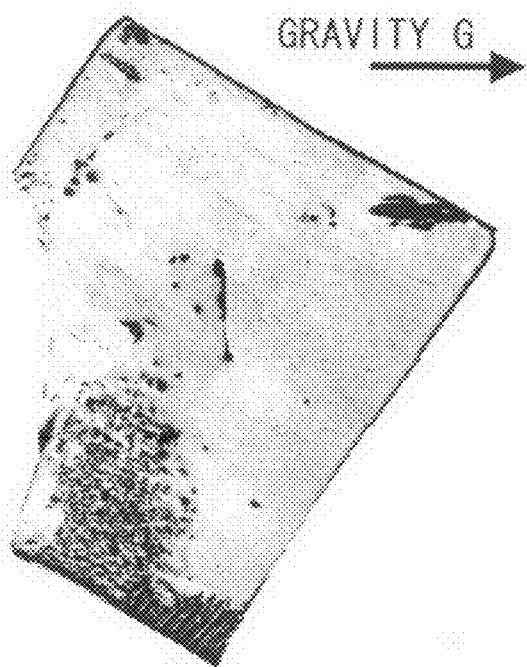
FIG. 16A is a polarizing micrograph after measuring the isotope abundance ratio of InPb sample (the sample is collected after cooling by 6° C. per hour from 250° C. to 190° C.).
Figure 16B:
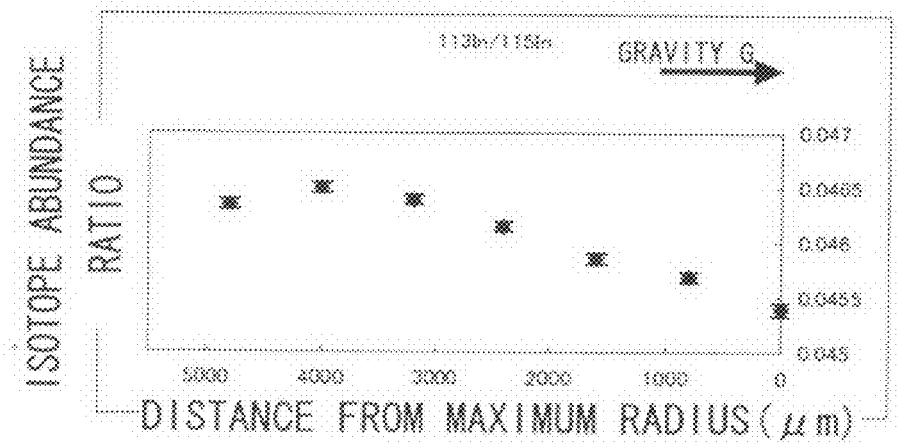
FIG. 16B is a view illustrating a measurement result of the isotope abundance ratio (ratio $^{113}$In/$^{115}$In) of the sample.
Figure 17A:
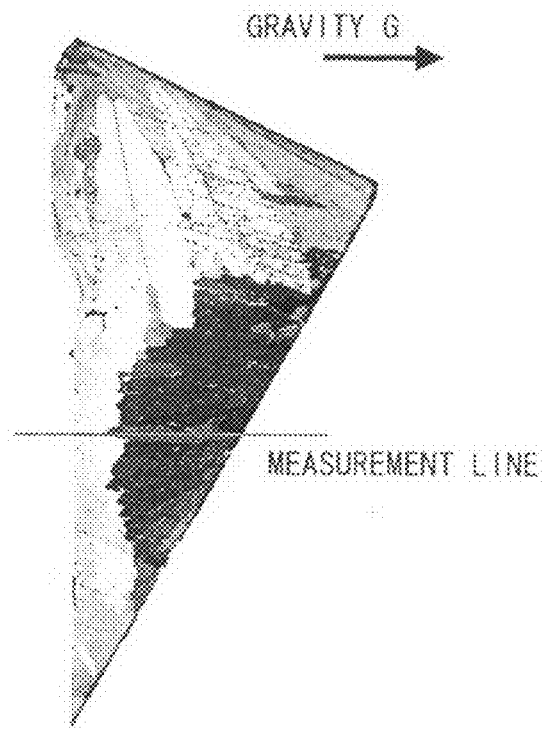
FIG. 17A is a polarizing micrograph after measuring the isotope abundance ratio of InBi sample of intermetallic compound (the sample is collected after cooling from 350° C. to 90° C. in 18 hours).
Figure 17B:
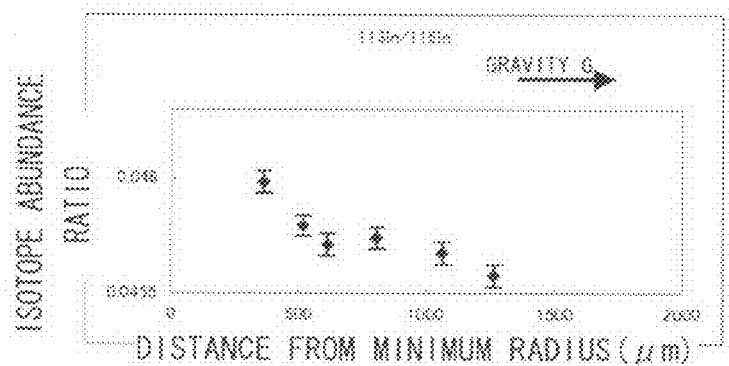
FIG. 17B is a view illustrating a measurement result of the isotope abundance ratio (ratio $^{113}$In/$^{115}$In) of the sample.

G=9.8 m/s$^2$), the experimental temperature was cooled by 6° C. per hour from 255° C. to 190° C. which was above the melting point (156° C.) at normal pressure, and the experimental time was 13 hours. As a starting sample, grain sample was dissolved and solidified in a test tube, and the starting sample was cut as a cylindrical sample with a length of 7 mm and a diameter of 5 mm. A capsule of SU304 with an inner diameter of 5 mm was filled with this and used. A polarizing micrograph of the sample in which a face including a rotational axis was cut and the surface was polished was shown in FIG. 16A, and the isotope abundance ratio $^{113}$In/$^{115}$In was shown in FIG. 16B. From the results of composition analysis and structure analysis obtained after the experiment, it was confirmed that an inclined structure of an atom scale was formed such that the heavy Pb atoms inclined in the gravity direction. The isotope abundance ratio in a direction horizontal to the gravity was investigated using SIMS. As a result, there was a gradient in the isotope abundance ratio such that heavy $^{115}$In increased in a direction of the strong gravity. In this experiment 2, twice the gradient in the isotope abundance ratio with the process time of approximately ⅛ was realized in comparison with the case of experiment 1. This suggested that the efficient isotope enrichment might be expected by finding optimal experimental conditions.

Example 6

Intermetallic Compound (InBi): Liquid State

As an example that the material to be processed was an intermetallic compound, the case where the intermetallic compound (InBi) was used was introduced. The melting point was 110° C. In the experiment, an air-turbine type supercentrifuge in Japan Atomic Energy Agency, capable of generating a gravity field of 1,000,000 G (1 G=9.8 m/s$^2$) or more for 100 hours or more at a high temperature was used. The analysis of the isotopes was performed by Institute for Study of the Earth's Interior, Okayama University which is located in Mitomo, Okayama Prefecture by using Cameca ims-5f secondary ion mass spectrometry (SIMS). The experimental conditions were as follows. The gravity field in the maximum radius of the sample was 810,000 G (1 G=9.8 m/s$^2$), the experimental temperature was cooled down to 90° C. for 18 hours after reaching 350° C. and this was regarded as the end of the experiment. Therefore, this is mainly the experiment in the liquid state. As a starting sample, grain sample was dissolved and solidified in a test tube, and the starting sample crushed again was dissolved and solidified in a glass tube with an inner diameter of 5 mm. The starting sample was cut as a cylindrical sample with a length of 5 mm and a diameter of 5 mm. A capsule of SU304 with an inner diameter of 5 mm was filled with this and used.

Figure 15A:
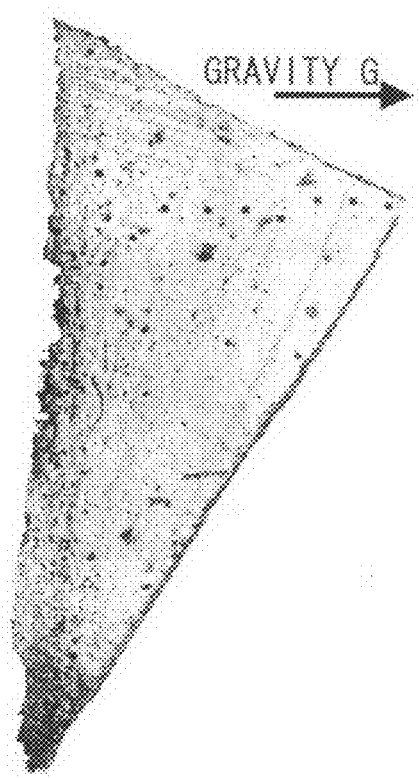
FIG. 15A is a polarizing micrograph after measuring the isotope abundance ratio of InPb solid sample (150° C. and 100 h).
Figure 15B:
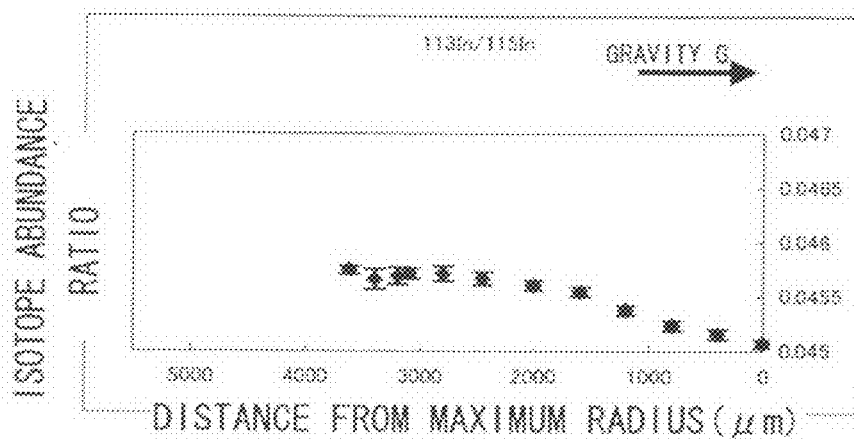
FIG. 15B is a view illustrating a measurement result of the isotope abundance ratio (ratio $^{113}$In/$^{115}$In) of the sample.

A polarizing micrograph of the sample in which a face including a rotational axis was cut and the surface was polished was shown in FIG. 15A, and the isotope abundance ratio $^{113}$In/$^{115}$In was shown in FIG. 15B. In is composed of two isotopes, $^{113}$In and $^{115}$In. The isotope abundance ratio in a direction horizontal to the gravity was investigated using SIMS (secondary ion mass spectrometry). As a result, there was a gradient in the isotope abundance ratio such that heavy $^{115}$In increased in a direction of the strong gravity. It was a notable fact here that the concentration profile of Bi and In after the experiment was unchanged even through the centrifugal process, and the ratio of the intermetallic compound Bi:In=1:1 was maintained, and, meanwhile, the change in the isotope abundance ratio of In was observed. From this experimental result, it was understood that sedimentation of isotopes occurred even in the compound in the system where the diffusion phenomenon might be expected. From this experimental result, it was clear that sedimentation of isotopes occurred even in a nonstoichiometric compound and chalcogenide including much lattice defect (in particular, point defect) necessary at least for diffusion.

Key points of the examples will be summarized. In Se in the liquid state, Se—Te alloy in the solid state, and AgI in the solid state, the concentration ratio at a normal state was higher than the case of the simulation of gas. This indicated that it departed from the ideal system due to the interaction between atoms, and the concentration change by sedimentation of atoms became large. It suggested that enrichment in the condensed state was very effective. In same Se with the same process time, the larger concentration ratio was obtained in the liquid state in comparison with the solid state. This might be because the diffusion speed was different. In the same process time and in the solid state, the larger concentration ratio was obtained in Se—Te alloy in comparison with single Se. This was because the diffusion speed and the activity coefficient were different between a simple substance and alloy. In AgI and CuI as super-ionic conductors, the concentration of the same level was obtained in the process time of 24 hours and the process time of 100 hours. This indicated that enrichment was achieved in a very-short time, that is, the diffusion speed was extremely fast, enrichment in the condensed state was very effective, and the like.

INDUSTRIAL APPLICABILITY

In the industrial application of isotope materials, energy isotope materials such as U and Pr for atomic fission for atomic power generation, and tritium and 6Li for tritium for atomic fusion are the first industrial field. In particular, gas diffusion method and gas centrifugal method are mainly used for enrichment of uranium. Nuclear energy development and utilization starts with uranium enrichment, and, in the uranium enrichment technique, low-cost and operational safety are important. There are three methods of enrichment techniques in the world, the gas diffusion method, the gas centrifugal separation method, and a laser method.

In the gas diffusion method, uranium hexafluoride (UF6) of corrosive gas is the material. The separation coefficient is approximately 1.003, and a large-scale cascade is set up in order to obtain enriched uranium with a concentration of 3 to 4%. In such gas diffusion method, due to corrosive gas, low separation coefficient, and high-cost caused by the large-scale facilities, there are issues in industrial applicability In the gas centrifugal separation method, UF6 is the material. The separation coefficient is expected to be 1.4, and a cascade is set up in order to obtain enriched uranium. In this method, due to corrosive gas, and high-cost caused by the large-scale facilities, there are still issues in industrial applicability.

On the other hand, in a method of separating and enriching isotopes using sedimentation of atoms by the acceleration field in accordance with the present invention, the high efficiency and miniaturization of the system are expected, and separated and enriched H, Li, U, Pr, and the like are used as nuclear energy materials.

Separated and enriched C, N, O, F, Cr, Ga, Tc, I, Au, Tl, Br, In, La, Eu, Gd, Dy, Ho, Yb, Lu, Re and the like are used as stabilized isotopes or medical isotopes.

Separated and enriched C, Rb, Sr, La, Sm, Ln, Pb and the like are used for age measurement in the ancient history.

Separated and enriched B is used as a neutron absorbent.

Separated and enriched Be, C, B, Na, K, Cs, Mg, B, Al, Si, Ge, Co, Fe, Ga, As, P, Sb, Zn, In, Bi, Sn, S, Se, F, CL, I, O, N, and the like are used as semiconductor materials. In semiconductor, the presence of isotopes has an effect of decreasing a thermal conductivity, and there are issues of interfusion of radioactive elements so that separation and enrichment techniques in the present invention serve high utility values. The same materials are also used for quantum semiconductor materials. For example, Si attracts attention as a semiconductor for a quantum computer. A method of the present invention is effective for manufacturing a semiconductor of pure isotope semiconductors, and a semiconductor without radioactive elements.

H, He, N, O, F, Ne, CI, Ar, Kr, Xe, Rn and the like as gas materials at the normal state become applicable in the liquefied and condensed state in a low temperature and under high pressure.

Moreover, stabilized isotopes such as Cr, Br, In, La, Eu, Gd, Dy, Ho, Yb, Lu, Re, Au and the like are important isotope materials for medical use. However, since they are expensive, the high-efficiency, high-safety without using corrosive gas, economic efficiency with compact facilities, unique techniques and the like in comparison with the case using gas by the present invention are expected.

The invention claimed is:

1. A method of enriching and separating an isotope material comprising:
applying an acceleration field to the isotope material in a condensed state containing elements of two or more kinds of isotopes under a temperature specified by the isotope material; and
sequentially transferring the isotope material to one or a plurality of sedimentation tanks by liquid flow or plastic flow of the isotope material, and enriching and separating the isotopes of the isotope material in each of the sedimentation tanks using sedimentation of atoms through the acceleration field,
wherein the material primarily contains at least halide or a super-ionic conductor, and the specified temperature is a recrystallizing temperature or more.

2. A method of enriching and separating an isotope material comprising:
applying an acceleration field to the isotope material in a condensed state containing elements of two or more kinds of isotopes under a temperature specified by the isotope material,
sequentially transferring the isotope material to one or a plurality of sedimentation tanks by liquid flow or plastic flow of the isotope material, and enriching and separating the isotopes of the isotope material in each of the sedimentation tanks using sedimentation of atoms through the acceleration field,
wherein the material primarily contains at least a material being in a gas state at a normal state, and the specified temperature is a boiling point or less and an absolute zero or more under the acceleration field.

3. A method of enriching and separating an isotope material comprising:
housing the isotope material in a condensed state containing elements of two or more kinds of isotopes in a rotor having a plurality of sedimentation tanks in a multistage arrangement;
applying an acceleration field to the isotope material housed in the rotor under a temperature specified by the isotope material; and
sequentially transferring the isotope material to one or more of the plurality of sedimentation tanks by liquid flow or plastic flow of the isotope material, and enriching and separating the isotopes of the isotope material in each of the sedimentation tanks using sedimentation of atoms through the acceleration field,
wherein a temperature at a rotational center section of the rotor is made higher than a temperature at an outer periphery section of the rotor so that stirring of the material by a convection is prevented.

4. The method of enriching and separating an isotope material according to claim 3, wherein a plurality of rotors are disposed in a cascaded arrangement, and the isotope material enriched in the rotor is sequentially transferred to another rotor so that a concentration ratio of the isotope material increases.

5. The method of enriching and separating an isotope material according to claim 3, wherein the material overflowed from the sedimentation tank at a final stage of the rotor returns to the sedimentation tank at a first stage so that a concentration ratio of the isotope material increases.

6. A rotor comprising:
a receiving section configured to receive an isotope material in a condensed state containing elements of two or more kinds of isotopes, and rotatable about a rotational axis; and
a plurality of sedimentation tanks disposed along an inner wall of the rotor coaxially with the receiving section, each tank having a connecting channel configured to allow the isotope material to exit the tank,
wherein the rotor is configured so that:
an acceleration field is generated in accordance with a rotation,
the isotope material supplied to the receiving section is sequentially transferred to the plurality of sedimentation tanks through the connecting channels, and
the isotopes of the isotope material are enriched and separated in each of the sedimentation tanks.

7. The rotor according to claim 6, wherein the plurality of sedimentation tanks are disposed above the receiving section.

8. The rotor according to claim 7, wherein the receiving section also serves as a sedimentation tank in one of the plurality of sedimentation tanks.

9. The rotor according to claim 6, wherein the plurality of sedimentation tanks are disposed below the receiving section, and the receiving section and the sedimentation tank in one of the plurality of sedimentation tanks are connected through a transfer hole.

10. The rotor according to claim 7, wherein the receiving section has a spindle-shaped bottom projecting to a direction of the sedimentation tanks with a center position corresponding to the rotational axis.

11. The rotor according to claim 7, wherein each of the connecting channels of the plurality of sedimentation tanks is disposed in positions different from one another as viewed from a rotational axis direction.

12. The rotor according to claim 11, wherein each of the connecting channels of the plurality of sedimentation tanks is disposed in positions 180 degrees symmetric to one another as viewed from the rotational axis direction.

13. The rotor according to claim 7, wherein a distance from the rotational axis of the plurality of connecting channels increases as being away from the receiving section.

14. An apparatus for separating and enriching an isotope material comprising:
a rotor having a receiving section of the isotope material which is rotatable about a rotational axis, and a plurality of sedimentation tanks disposed along an inner wall of the rotor coaxially with the receiving section each tank having a connecting channel configured to allow the isotope material to exit the tank; and supplying means of the isotope material for supplying the isotope material in a condensed state containing elements of two or more kinds of isotopes to the receiving section, wherein the apparatus is configured so that:

an acceleration field is generated in accordance with a rotation, the isotope material supplied to the receiving section is sequentially transferred to the plurality of sedimentation tanks through the connecting channels, and the isotopes of the isotope material are enriched and separated in each of the sedimentation tanks.

15. The apparatus for separating and enriching the isotope material according to claim 14, wherein a temperature at a rotational center section of the rotor is made higher than a temperature at an outer periphery section of the rotor.

* * * * *